US 11,550,786 B1
Jan. 10, 2023

(12) United States Patent
Naganathan et al.

(54) SYSTEM, METHOD, AND COMPUTER PROGRAM FOR CONVERTING A NATURAL LANGUAGE QUERY TO A STRUCTURED DATABASE UPDATE STATEMENT

(71) Applicant: Apttus Corporation, San Mateo, CA (US)

(72) Inventors: Venkatraman Naganathan, San Jose, CA (US); Manjula Devi Malairasan, San Mateo, CA (US); Koti R. Nandyala, Fremont, CA (US)

(73) Assignee: Apttus Corporation, San Mateo, CA (US)

( * ) Notice: Subject to any disclaimer, the term of this patent is extended or adjusted under 35 U.S.C. 154(b) by 0 days.

(21) Appl. No.: 16/999,582

(22) Filed: Aug. 21, 2020

Related U.S. Application Data

(63) Continuation-in-part of application No. 16/781,940, filed on Feb. 4, 2020.

(51) Int. Cl.
*G06F 16/2452* (2019.01)
*G06F 16/21* (2019.01)
(Continued)

(52) U.S. Cl.
CPC ...... *G06F 16/24522* (2019.01); *G06F 16/212* (2019.01); *G06F 16/2379* (2019.01); *G06F 16/243* (2019.01)

(58) Field of Classification Search
CPC ............ G06F 16/24522; G06F 16/212; G06F 16/2379; G06F 16/243
See application file for complete search history.

(56) References Cited

U.S. PATENT DOCUMENTS 5,960,407 A 9/1999 Vivona
6,473,084 B1 10/2002 Phillips et al.
(Continued)

FOREIGN PATENT DOCUMENTS

CA 2742395 1/2019
CN 1315705 3/2001
(Continued)

OTHER PUBLICATIONS

Oracle: Automating the Quote-to-Cash Process: An Oracle White Paper, Jun. 2009, pp. 1-19, 2009.
(Continued)

*Primary Examiner* — William B Partridge
*Assistant Examiner* — Aryan D Toughiry
(74) *Attorney, Agent, or Firm* — Lessani Law Group, PC

(57) ABSTRACT

The present disclosure describes a system, method, and computer program for converting a natural language update instruction to a structured update database statement. In response to receiving a natural language query for a database, an NLU model is applied to the query to identify an intent and entities associated with the query. If the intent is to update a data object, the system evaluates the entities to identify update fields and update values. Update fields are matched to update values based on update parameters, operand type of the update value, and location of the update fields and values. For each update field and value pair, an update context is calculated to determine whether the update value is absolute or relative to an existing field value. An update plan is created with the update field and value pairs and corresponding update contexts, and a database update statement is generated from the update plan.

21 Claims, 14 Drawing Sheets

(51) Int. Cl.
  *G06F 16/23* (2019.01)
  *G06F 16/242* (2019.01)

(56) References Cited

U.S. PATENT DOCUMENTS

| | | |
|---|---|---|
| 7,328,177 B1 | 2/2008 | Lin-Hendel |
| 7,574,381 B1 | 8/2009 | Lin-Hendel |
| 7,725,358 B1 | 5/2010 | Brown et al. |
| 8,498,954 B2 | 7/2013 | Malov et al. |
| 8,644,842 B2 | 2/2014 | Arrasvuori et al. |
| 9,519,907 B2 | 12/2016 | Carter, III et al. |
| 10,289,261 B2 | 5/2019 | Aggarwal et al. |
| 10,521,491 B2 | 12/2019 | Krappe et al. |
| 10,621,640 B2 | 4/2020 | Krappe et al. |
| 10,783,575 B1 | 9/2020 | Krappe et al. |
| 11,232,508 B2 | 1/2022 | Krappe |
| 2002/0040332 A1 | 4/2002 | Maari et al. |
| 2003/0033240 A1 | 2/2003 | Balson et al. |
| 2006/0100912 A1 | 5/2006 | Kumar et al. |
| 2006/0136470 A1 | 6/2006 | Dettinger et al. |
| 2007/0016536 A1 | 1/2007 | Mirlas et al. |
| 2007/0039209 A1 | 2/2007 | White et al. |
| 2007/0087756 A1 | 4/2007 | Hoffberg |
| 2007/0162373 A1 | 7/2007 | Kongtcheu |
| 2008/0046355 A1 | 2/2008 | Lo |
| 2008/0091551 A1 | 4/2008 | Olheiser et al. |
| 2009/0048937 A1 | 2/2009 | Contreras et al. |
| 2009/0222319 A1 | 9/2009 | Cao et al. |
| 2009/0234710 A1 | 9/2009 | Belgaied Hassine et al. |
| 2009/0327166 A1 | 12/2009 | Carter, III et al. |
| 2010/0179859 A1 | 7/2010 | Davis et al. |
| 2010/0262478 A1 | 10/2010 | Bamborough et al. |
| 2010/0306120 A1 | 12/2010 | Ciptawilangga |
| 2011/0246136 A1 | 10/2011 | Haratsch et al. |
| 2011/0246434 A1 | 10/2011 | Cheenath et al. |
| 2012/0173384 A1 | 7/2012 | Herrmann et al. |
| 2012/0221410 A1 | 8/2012 | Bennett et al. |
| 2012/0246035 A1 | 9/2012 | Cross et al. |
| 2012/0254092 A1 | 10/2012 | Malov et al. |
| 2012/0259801 A1 | 10/2012 | Ji et al. |
| 2013/0103391 A1 | 4/2013 | Millmore et al. |
| 2013/0132273 A1 | 5/2013 | Stiege et al. |
| 2014/0025529 A1 | 1/2014 | Honeycutt et al. |
| 2014/0136443 A1 | 5/2014 | Kinsey, II et al. |
| 2014/0149273 A1 | 5/2014 | Angell et al. |
| 2015/0120526 A1 | 4/2015 | Peterffy et al. |
| 2015/0142704 A1* | 5/2015 | London ............. G06Q 10/10 706/11 |
| 2015/0309705 A1 | 10/2015 | Keeler et al. |
| 2015/0348551 A1 | 12/2015 | Gruber et al. |
| 2015/0378156 A1 | 12/2015 | Kuehne |
| 2016/0034923 A1 | 2/2016 | Majumdar et al. |
| 2017/0004588 A1 | 1/2017 | Isaacson et al. |
| 2017/0068670 A1 | 3/2017 | Orr et al. |
| 2017/0124176 A1 | 5/2017 | Beznos et al. |
| 2017/0124655 A1 | 5/2017 | Crabtree et al. |
| 2017/0235732 A1 | 8/2017 | Williams et al. |
| 2017/0243107 A1 | 8/2017 | Jolley et al. |
| 2017/0351241 A1 | 12/2017 | Bowers et al. |
| 2017/0358024 A1 | 12/2017 | Mattingly et al. |
| 2018/0005208 A1 | 1/2018 | Aggarwal et al. |
| 2018/0096406 A1 | 4/2018 | Krappe et al. |
| 2018/0218032 A1 | 8/2018 | Wong et al. |
| 2018/0285595 A1 | 10/2018 | Jessen |
| 2018/0293640 A1 | 10/2018 | Krappe |
| 2018/0336247 A1 | 11/2018 | Ignatyev et al. |
| 2018/0349324 A1 | 12/2018 | Krappe et al. |
| 2018/0349377 A1* | 12/2018 | Verma .................. G06N 5/022 |
| 2019/0258632 A1 | 8/2019 | Pal et al. |
| 2019/0370388 A1* | 12/2019 | Li .................. G06F 16/2365 |
| 2020/0057946 A1* | 2/2020 | Singaraju ............... G06N 20/00 |
| 2020/0065354 A1 | 2/2020 | Krappe et al. |
| 2021/0089587 A1 | 3/2021 | Gupta et al. |
| 2021/0090575 A1* | 3/2021 | Mahmood ............... G10L 17/10 |
| 2022/0148071 A1 | 5/2022 | Krappe |

FOREIGN PATENT DOCUMENTS

| | | |
|---|---|---|
| CN | 106910091 | 6/2017 |
| EP | 2650776 | 10/2013 |
| EP | 3073421 | 9/2016 |
| JP | 2001290977 | 10/2001 |
| JP | 2017146909 | 8/2017 |
| WO | 0052605 | 9/2000 |
| WO | 03003146 | 1/2003 |
| WO | 2015106353 | 7/2015 |

OTHER PUBLICATIONS

McCormick, M., "What is Quote to Cash?" Jan. 20, 2016, Blog, BlackCurve, pp. 1-8, 2016.

Microsoft/APTTUS: Ultimate Guide to Quote-To-Cash for Microsoft Customers, Web Archives, Oct. 1, 2015, pp. 1-28.

Morelli et al., "IBM SPSS Predictive Analytics: Optimizing Decisions at the point of impact", pp. 1-59, 2010.

Wainewright, Phil, "Salesforce, Microsoft quote-to-cash partner Apttus raises $88m", Sep. 29, 2016, pp. 1-7.

Wainewright, Phil, Apttus Applies Azure Machine Learning to Quote-to-Cash, Apr. 3, 2016, pp. 1-5.

Wireless News: Banglalink Keeps Mobile Subscribers Using Predictive Analytics with KXEN, Close-Up Media, Inc., pp. 1-2, Oct. 5, 2013.

Riggins, J., "Interview Quote-to-Cash Pioneers Apttus Links Leads to Revenue", May 21, 2014, pp. 1-7.

Xie, Qitao et al., "Chatbot Application on Cryptocurrency", 2019 IEEE Conference on Computational Intelligence for Financial Engineering & Economics, pp. 1-8, 2019.

Spedicato G., et al., Machine Learning Methods to Perform Pricing Optimization. A Comparison with Standard GLMs, Dec. 2018.

* cited by examiner

EXAMPLE SYSTEM ARCHITECTURE lookupQuote ✎
Labeled entities: recordName, recordAuthor, recordCount, contact, updateFieldName ✎ Edit  ⇄ Reassign intent ⌄  + Add as pattern  ▥ Delete

| ☐ Example utterance | Score ⓘ |
|---|---|
| Enter an example of what a user might say and hit Enter | |
| show me all the quotes for the acme opportunity | 0.97 |
| what is the expiration date of sally fulger ' s ghastly fire service proposal | 0.96 |
| what is the net price on saul pinkely ' s "fortunistics" proposal that has a valid until date of sept 30 | 0.96 |
| let me see miles ' quotes expiring next month for the gugensheim account | 0.98 |
| pull up proposals named "durango hudert festival" | 0.95 |
| show quotes for the hughbar ironworks assoc account | 0.99 |
| look up quotes for account unilever | 0.96 |
| can i see the quotes which tom created in the last 5 months | 0.98 |
| pull up quotes for last year which I created | 0.98 |
| show me quotes for opps in negotiation | 0.91 |

*FIG. 6*

SYSTEM, METHOD, AND COMPUTER PROGRAM FOR CONVERTING A NATURAL LANGUAGE QUERY TO A STRUCTURED DATABASE UPDATE STATEMENT

RELATED APPLICATIONS

This application is a continuation-in-part of U.S. patent application Ser. No. 16/781,940, titled "System, Method, and Computer Program for Converting a Natural Language Query to a Structured Database Query," and filed on Feb. 4, 2020, the contents of which are incorporated by reference as if fully disclosed herein.

BACKGROUND OF THE INVENTION

1. Field of the Invention

This disclosure relates generally to a natural language interface to a database system, and, more specifically, to converting a natural language update request to a structured database update statement in a B2B environment.

2. Description of the Background Art

With the advent of natural language chatbots, such as SIRI and ALEXA, users are increasingly employing bots to complete routine tasks, such as playing music, checking the weather, etc. Natural language bots are typically used in the consumer space, and they are designed to work with search engines that perform searches based on natural language key words.

Natural language bots can also be useful in business-to-business (B2B) applications. However, B2B systems are driven by heavy-duty data that is powered by complex databases, and chatbots are not designed to interface with such databases. One cannot query such a database using natural language key words due to the variability, complexity, and inherent ambiguity in natural language utterances.

Accessing data in B2B database requires a highly-structured database query language, such as SQL. A typical database query will reference a database object (e.g., a database table), one or more subject fields corresponding to a database object, one or more conditions referencing database fields, and sort/order by criteria. There are no implicit fields, semantic ambiguity, or fuzzy terms in a database query (see description of implicit fields, semantic ambiguity, and fuzzy terms below).

The highly-structured and complex nature of database queries present a challenge for natural language bots. Natural language queries are relatively unstructured and highly variable. For example:

- Terms that might correspond to database fields can appear anywhere in a natural language query and some may be referred to only implicitly. For example, in the request, "show me quotes over $20 k from last year", the price and created date fields are not specified explicitly even though the $20 k implicitly refers to the quoted price and "from last year" implicitly refers to the date the quote was created.
- Keywords in a natural language query can have multiple meanings, depending on the context. For example, the word "created" could be used to refer to a person that created an object/file or a date on which the object/file was created.

Ambiguity is inherent in natural language, and the database field to which a term corresponds depends on context. For example, take the following two phrases:
"Show me agreements I created."
"Show me agreements I created last year."
"Show me agreements that were created last year."
Assume the database object for agreements has the fields "createdBy" and "createdDate." Then, in the first two phrases, the entity "created" should be mapped to the "createdBy" field, and in the last phrase the entity "created" should be mapped to the "createdDate" field.

There are many different ways to express the same request, including many variations in the way object names, operators, operands, and conditions may be expressed. For example, the following two phrases ask for the same thing:
"Show me the last 3 agreements over $200 k from last year that I created in Q4 2020."
"Show me the most recent 3 agreements from 2020 that I created in the $4^{th}$ quarter with an account value greater than $200 k."
Phrases may be fuzzy, such as "a couple of weeks ago," "in a few months," "around $200 k," etc.

A natural language bot for a B2B application must be able to effectively translate a natural language query to a database query. Known natural language bots use rudimentary natural language processing to parse part of a sentence, which, when used as an interface to a B2B base, results in an incomplete translation of the natural language query to a database query. This leads to incorrect or suboptimal results.

Therefore, there is demand for a system that can effectively translate a natural language query to a database query in B2B applications. Moreover, a user may want to update a database via a natural language query, and therefore, the is also demand for a system that can effectively translate a natural language update request, such as "Increase the discount on the recent Acme quotes that are over $500 k by 5%," to a structured update database statement.

SUMMARY OF THE DISCLOSURE

The present disclosure relates to a natural language system for querying a database in a B2B system. Specifically, the present disclosure describes a system, method, and computer program for converting a natural language query to a structured database query.

A computer system (i.e., a natural language bot) receives a user's natural language query for a B2B application. An NLU engine within the system applies an NLU model to the query to identify an intent and entities associated with the query. The NLU engine tags the entities with a type.

The system identifies a database object in a B2B database corresponding to the identified intent. The system also identifies candidate query fields and operands for the query based on the entities associated with the query.

The system evaluate the candidate query fields and operands to identify any subject fields, conditional expressions, record count limit, and ordering/sorting criteria for the query. The system creates a query plan with the results of such evaluation and then generates a database query based on the query plan.

To evaluate the candidate query fields and operands, the system obtains query parameters for the query. The query parameters include specifications for standard and object-specific fields, as well as default fields for operand types.

The system preprocesses or "cleans up" the candidate query fields and operands for further processing. In one embodiments, this comprises removing redundant, trivial, and subsumed candidate query fields and operands from the list of candidate fields and operands being evaluated.

The system then determines if any of the candidate query fields are subject fields based on whether there are any queryable fields between the object name and an interrogative (e.g., "when," "who," "what") or lookup action entity (e.g., "tell me").

The system matches any candidate query fields that are not subject fields to operands based on the query parameters, operands types, and the location of operands relative to the candidate query fields. Any remaining operands are matched to default fields based on the default fields for the operands specified in the query parameters.

The system adds the matched operands and query fields to query plan as parameters for a conditional expression. If the user query does not include explicit order or sorting criteria, the system determines whether to add any implicit ordering or sorting criteria to the query plan.

The present disclosure also relates to a natural language system for updating a database in a B2B system. A computer system (i.e., a natural language bot) receives a user's natural language input for a B2B application. An NLU engine within the system applies an NLU model to the query to identify an intent and entities associated with the query. The NLU engine tags the entities with a type. If the identified intent relates to updating a database, the entity types may include an update field, an update value, and an update verb and corresponding proposition.

If the intent relates to updating a database, the system evaluates the entities to identify update fields and corresponding update values for a structured database update statement. For each update field-update value pair, the system identifies an update context based on the update verb and corresponding preposition proceeding the pair. For example, the system determines whether the update instructions are absolute (e.g., "set the start date to Monday) or relative to another value (e.g., "increase the discount by 5%). The system generating an update plan that specifies the identified update field-update value pair(s) and the corresponding update context for each pair.

The system also determine whether previous user input provides context for the data record(s) to be updated. For example, if immediately prior to the update request, the user queried records for a database object and then uttered an update request with respect to one or more fields in the records, the system would assume that the update request pertains to the retrieved records and no further processing is required to identify the records being updated. In response to previous user input providing context for the record(s) that will be updated, the system asks the user to confirm the update field(s) and update value(s) in the update plan. In response to receiving user confirmation, the system create a database update statement based on the update plan and the record(s) identified from previous user input.

In response to previous user input not providing context for the record(s) to be updated, the system evaluates the entities that are not in the update plan for conditional parameters to identify the record(s) to be updated. The system then confirms the identified record(s), the update field(s), and the update value(s) with the user. In response to receiving user confirmation, the system generates an update database statement based on the update plan and the conditional parameters.

BRIEF DESCRIPTION OF THE DRAWINGS

FIG. 6 is a screen shot that illustrates an example of queries used to train an NLU model to identify a "lookup-Quote" intent.

DETAILED DESCRIPTION OF THE PREFERRED EMBODIMENTS

The present disclosure relates to a natural language system for querying a database in a B2B system. Specifically, the present disclosure describes a system, method, and computer program for converting a natural language query to a structured database query. A structured database query is a query that requires specific syntax and delineates the database object, subject fields of the query, and any conditional parameters. A SQL query is an example of a structured database query. As described with respect to FIGS. 7-10, the present disclosure also relates to a natural language system for updating a database in a B2B system. Specifically, the disclose describes a system, method and computer program for converting natural language update instructions to a structured database update statement. A structured database update statement is an update instruction that requires specific syntax and delineates the instance(s) of a database object that will be updated, the update field(s) and the corresponding update value(s) A SQL update statement is an example of a structured database update statement.

The methods described herein are performed by a computer system ("the system").

1. Creating a Structured Database Query

Figure 1:
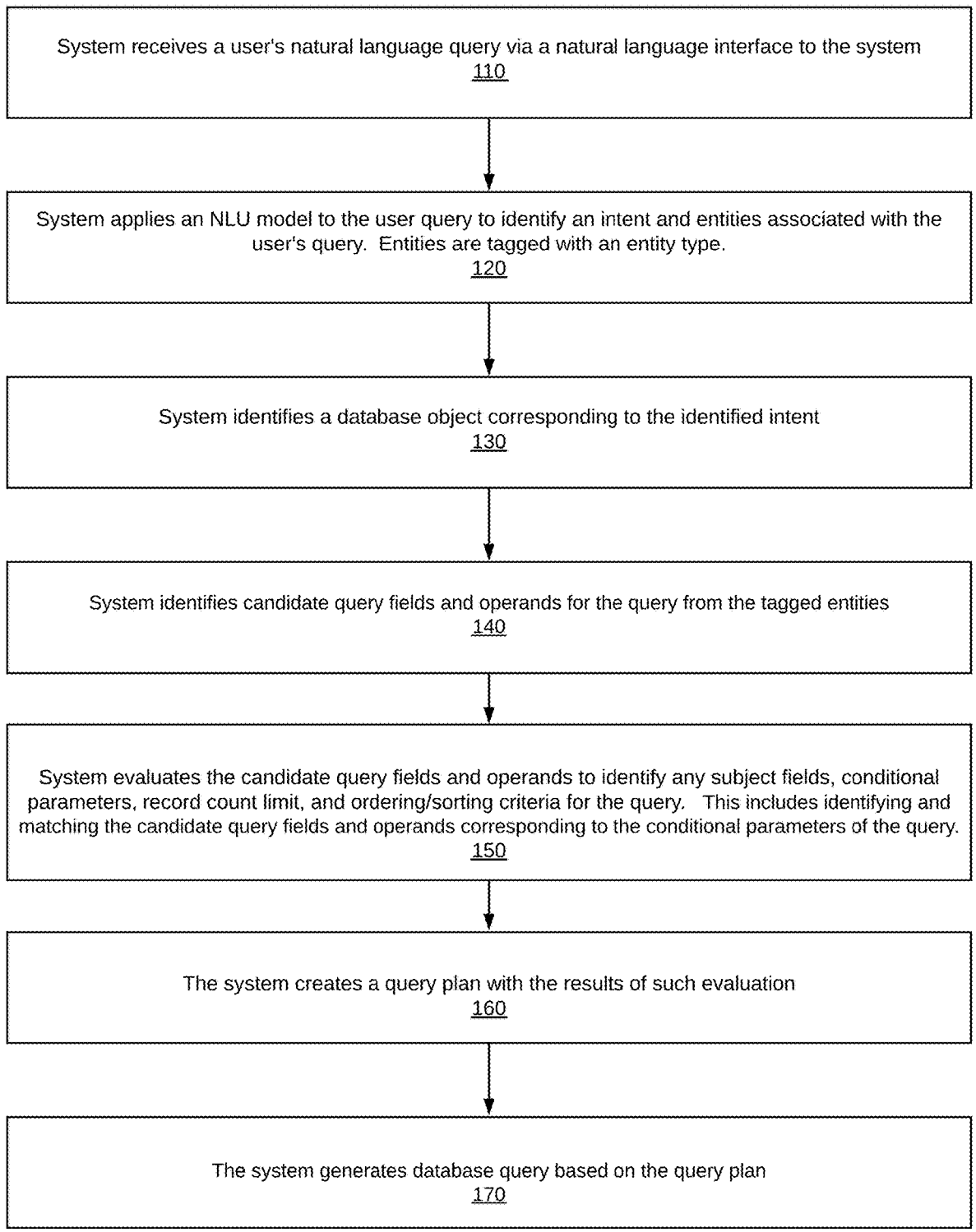
FIG. 1 is a flowchart that illustrates a method, according to one embodiment, for converting a natural language query into a structured database query.

FIG. 1 illustrates an overview of the steps for converting a natural language query into a structured database query. The system provides a natural language interface to a B2B application and receives a natural language query from a user for the B2B application (step 110). The natural language interface may be a text interface, a voice interface, an email interface, and/or any other interface in which a natural language query may be inputted into the system (e.g., any interface provided via an Internet-enabled device, such as desktop computer, laptop, mobile computing device, or embedded devices, etc.). For example, the user may text the system via a messaging interface or speak to the system via a voice interface. From the user perspective, the natural language interface appears as a bot or virtual agent that can be queried.

A natural language understanding (NLU) engine within the system applies an NLU model to the query to identify an intent and entities associated with the query (step 120). An NLU model is a machine-learning model that learns user intent and entity classifications based on training data.

The intent is the action the NLU engine predicts that the user wants to take, for example, to look up a quote or retrieve certain agreements. The NLU model is trained to identify intents based on training queries labeled as corresponding to an intent. FIG. 6 is a screenshot that illustrate an example of queries used to train an NLU model to identify a "lookupQuote" intent. The intent corresponds to a database object (e.g., a database table). In this example, "Quote" is a database object.

The entities correspond to the parameters of the query. For each entity, the NLU engine outputs a standardized value for the entity and an entity type. The NLU model is trained to map various words and phrases in a natural language query to standardized values for entities. For example, the NLU may be trained to map the words "total value," "value," "amounts," "worth," "net worth," and "annual worth" to the entity value "amount."

Training phrases and words labeled with an entity type are used to train the NLU model to recognize entity types. The entity type associated with an entity allows the system to determine whether the entity is a query field or operand and whether the entity requires further processing for purposes of determining how to handle the entity in a structured database query. In one embodiment, there are entity type tags for the following:

Object Name: Entities that correspond to a database object such as "agreements" or "quotes" are tagged as an object name.

Standard fields.
Standard fields are queryable database fields that are common across a number of database objects. For example, in a business database with agreements and quotes, standard fields may include fields that specify the start date (e.g., "startDate"), the close date (e.g., "closeDate"), and the expiration date (e.g., "validUntilDate"), etc. of an agreement or quote. Queryable database fields are database fields that can be queried.

Object-Specific fields
Object-specific fields are queryable database fields specific to a particular database object.

Filter Modifiers.
Filter modifiers are entities that alter the count or order of the query results. For examples, these may include terms such as "last," "first," "full," "ascending," "descending," and "reverse."

Filter Operations
Entities that are Boolean, comparison, and order by operators are labeled as a filter operation. Examples include "range," "greater," "lesser," "equal," "and," "or" "not," and "order by."

Date, time, and currency entities.
Entities that related to a date, a date range, and currency are tagged accordingly.

Record Count
A record count entity is a contextual entity that identifies how many records should be returned.

Contextual entities
A contextual entity is an operand for which the corresponding queryable field can be determined by the NLU model from the context of the query. A record name is an example of a contextual entity. For example, in the query "show me the Acme quote that I created last month," the entity "Acme" would be understood to be the value for a record name field the quote object. Contextual entities may be object specific. For example, assume that a "line item" object has a field called "forecast category" that is unique to the line item object, and one of the possible values for the field is "at risk." In that case, in the query "show me line items at risk," the entity "at risk" is an object-specific contextual entity corresponding to the "forecast category" field.

Interrogatives: Words such as "who," "what," and "when" are tagged as interrogatives. As discussed in more detail below, interrogatives enable the system to identify subject fields for a query.

Lookup Action: Phrases that indicate a request to lookup data, such as "tell me" and "show me," are lookup actions.

The table below illustrates an example of the tagged entity types and values for the phrase "Who created the top 3 Acme quotes from last year that are over $20 k that expire in the next 24 months and when?" in a B2B application that enables users to create quotes and agreements. This query is referred to herein as "the example query." The intent associated with the example query is to look up a quote (e.g., "lookupQuote").

TABLE 1

NLU Entities

| Phrase | Type | Value | StartIndex | EndIndex |
|---|---|---|---|---|
| Who | interrogative | Who | 0 | 2 |
| Created | standardField | createdDate OrCreatedBy | 4 | 10 |
| Top | filterModifier | Top | 16 | 18 |
| 3 | recordCount | 3 | 20 | 20 |
| Acme | recordName | Acme | 22 | 24 |
| Quotes | objectName | Quote | 26 | 31 |
| from last year | builtin.datetimeV2. daterange | [object Object] | 33 | 46 |
| From | filterOperation | Range | 33 | 36 |
| Last | filterModifier | Last | 38 | 41 |
| Over | filterOperation | Greater | 57 | 60 |
| $20k | builtin.currency | 20000 | 62 | 65 |
| Expire | agreementStatus | endDate | 72 | 77 |
| Expire | quoteField | validUntilDate | 72 | 77 |
| in the next 24 months | builtin.datetimeV2. daterange | 2019 Oct. 20 to 2021 Oct. 20 | 79 | 99 |
| When | interrogative | When | 105 | 108 |

The system identifies the database object being queried based on the intent with which the query was labeled by the NLU engine (step 130). For example, if the NLU engine determines that the intent for the phrase, "show me last 3 agreements over $200 k from last year that I created ending in Q4 2020," is "lookup Agreement," then the system determines that "Agreement" is the database object. Likewise, if the NLU determines that the intent for the phrase "Who created the top 3 Acme quotes from last year that are over $20 k that expire in the next 24 months and when?" is "lookup Quote," then the system determines that "Quote" is the database object.

As state above, each entity identified by the NLU engine is tagged with an entity type. The system identifies candidate query fields and operands for further processing based on an entity's type tag (step 140). Standard fields, object-specific fields, and filter modifiers are categorized as candidate query fields. Filter operation and date/time/currency entities are categorized as candidate operands. In certain embodiments, entities tagged with record count or an object-specific contextual entities are treated as operands for purposes of step 140. In other embodiments, the system disregards contextual entities as this stage and adds them to the query plan at a later stage (e.g., as part of step 160)

The tables below illustrates an example of how the system would identify candidate query fields and operands from the tagged entities in Table 1:

TABLE 2a

Candidate Query Fields

| Phrase | Type | Value | StartIndex | EndIndex |
|--------|------|-------|------------|----------|
| Created | standardField | Createdby OR createdDate | 4 | 10 |
| Top | filterModifier | Top | 16 | 18 |
| Last | filterModifier | Last | 38 | 41 |
| Expire | quoteField | validUntilDate | 72 | 77 |

TABLE 2b

Candidate Operands

| Phrase | Type | Value | StartIndex | EndIndex |
|--------|------|-------|------------|----------|
| 3 | recordCount | 3 | 20 | 20 |
| From | filterOperation | From | 33 | 36 |
| Over | filterOperation | Greater | 57 | 60 |
| From last year | Builtin.datetimeV2.daterange | 2018 Jan. 1 to 2018 Dec. 31 | 33 | 46 |
| In the next 24 months | Builtin.datetimeV2.daterange | 2019 Oct. 20 to 2021 Oct. 20 | 79 | 99 |
| $20k | Builtin.currency | $20k | 62 | 65 |

In Table 2a, the candidate query fields are the entities from Table 1 that are tagged as a standard field ("created"), an object-specific field ("expire"), or a filter modifier ("top" and "last"). In Table 3a above, the operands are the entities from Table 1 that are tagged as filter operations ("from," "over"), currency ("$20 k"), or a date range ("from last year," "in the next 24 months"). In addition, the entity "3" is a contextual entity (i.e., record count) that the system treats as an operand in this example embodiment.

The system evaluates the candidate query fields and operands to identify any subject fields, conditional parameters, record count limit, and ordering/sorting criteria for the query (step 150). This includes identifying and matching the query fields and operands corresponding to the conditional parameters of the query. This step is described in more details with respect to FIG. 2.

The system creates a query plan with the results of such evaluation (step 160). Any contextual entities not processed in step 150 are added to the conditional parameters of the query plan. The system then creates a database query based on the query plan (step 170). In creating the database query, the system maps query fields to actual database fields using a simple mapping of query field values to database fields. For each query field in the query plan, it then creates the applicable expression/statement within the database query using the applicable database field and the corresponding operand and operator associated with the query field. For each query field corresponding to a conditional expression, the system creates a simple condition for the database query using the mapped database field and corresponding operator and operand. All the simple conditions are combined for the actual conditional expression in the database query (e.g., all the where clause conditions are ANDed with each other to form an actual WHERE clause).

2. Evaluating Candidate Query Fields and Operands

Figure 2:
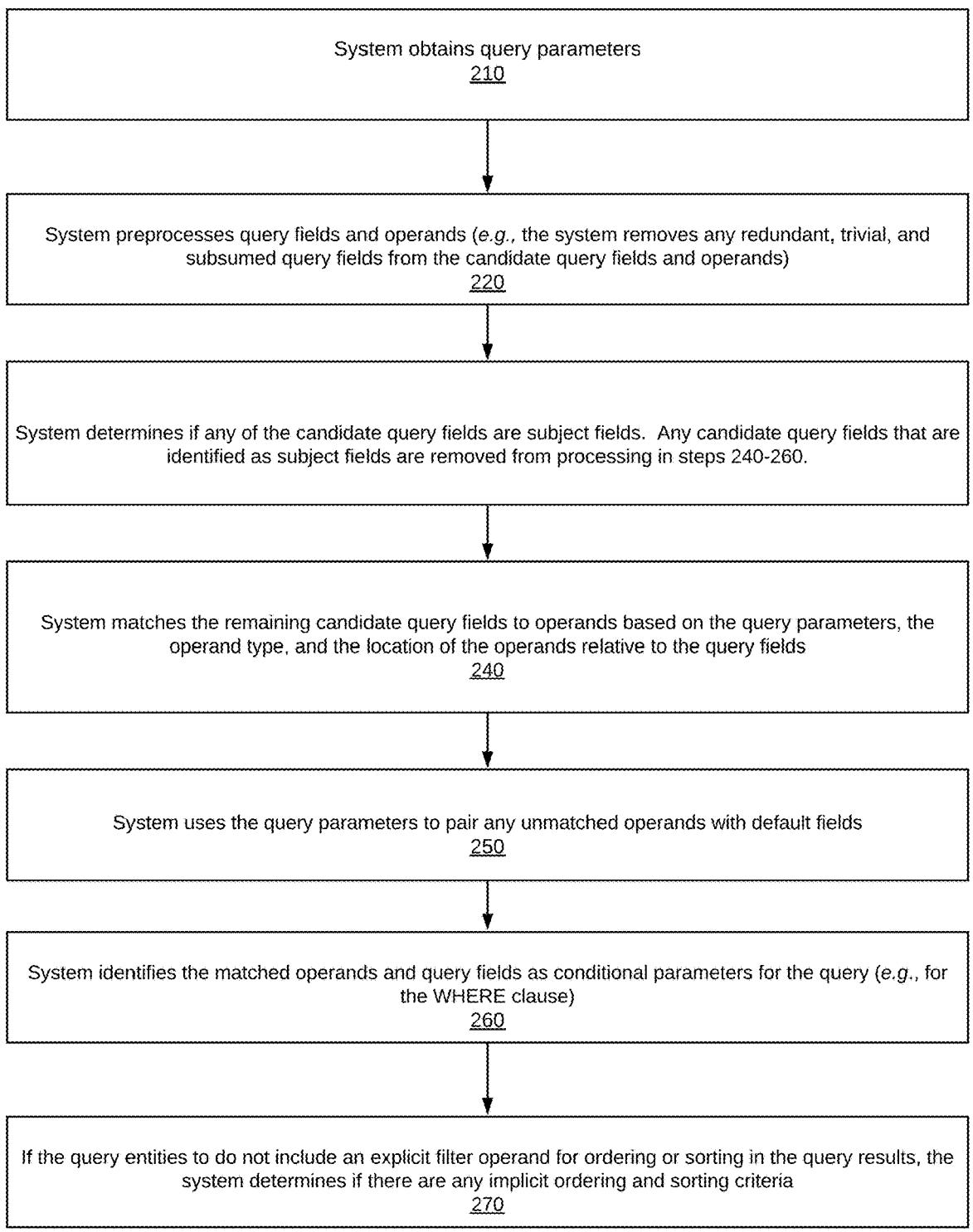
FIG. 2 is a flowchart that illustrates a method, according to one embodiment, for evaluating candidate query fields and operands to identify any subject fields, conditional parameters, and ordering/sorting criteria for the query.

FIG. 2 illustrates a method for evaluating candidate query fields and operands to identify any subject fields, conditional parameters, record count limit, and ordering/sorting criteria for the query.

2.1 Obtaining Query Parameters

In order to know how to process the candidate query fields and operands, the system obtains query parameters, including object-specific query parameters (step 210). The query parameters include specifications for standard fields and object-specific fields, as well as default fields for operand types. The specifications for a standard or object-specific query field may include the operand type accepted by the query field, whether the query field is a default field for the operand type, any matching rules for the query field (e.g., "match only to operands to the right of the query field"), and whether the query field is ambiguous. For example, the query parameters would specify that the field "validUntilDate" takes a date operand.

An ambiguous query field is one in which the entity associated with the field can map to two or more fields. For example, the entity "created" could be associated with the "createdBy" field in a database or the "createdDate" field in the database, depending on whether the user is referring to a person or a date.

In one embodiment, the query parameters are determined by a developer of the system, and the system accesses the applicable query parameters from a list or library of query parameters. In one embodiment, query parameters are defined for each database object.

2.2 Preprocessing Fields and Operands

The system preprocesses or "cleans up" the candidate query fields and operands to prepare them for further processing (step 220). For example, the system may preprocess the fields and operands by removing any redundant, trivial, and subsumed query fields and operands from the candidate query fields and operands. In one embodiment, this comprises the following steps:

System sorts query fields and operands based on start index.

If one operand is a superset of another operand, the system subsume the smaller one.

If one operand is a superset of a query field, the system subsumes the smaller query field.

For example, in the example query above, the word "from" is subsumed by the phrase "from last year." The word "last" is also subsumed by the phrase "from last year." Therefore, the system remove "from" from the list of operands to be processed and "last" from the list of query fields to be processed. Therefore, for purposes of the example query, this leaves the following query fields and operands for further processing:

TABLE 3a

Candidate Query Fields

| Phrase | Type | Value | StartIndex | EndIndex |
|---|---|---|---|---|
| Created | standardField | created | 4 | 10 |
| Top | filterModifier | top | 16 | 18 |
| Expire | quoteField | validUntilDate | 72 | 77 |

TABLE 3b

Operands

| Phrase | Type | Value | StartIndex | EndIndex |
|---|---|---|---|---|
| 3 | recordCount | 3 | 20 | 20 |
| From last year | Builtin.datetimeV2.daterange | 2018 Jan. 1 to 2018 Dec. 31 | 33 | 46 |
| Over | filterOperation | Greater | 57 | 60 |
| $20k | builtin.number | $20k | 62 | 65 |
| In the next 24 months | Builtin.datetimeV2.daterange | 2019 Oct. 20 to 2021 Oct. 20 | 79 | 99 |

2.3 Identify any Subject Fields of the Query Based on Interrogatives

The system determines if any of the candidate query fields are "subject fields" (step 230). Subject fields are fields from which values will be returned to the user. For example, in a SQL query the subject fields are the fields in a SELECT statement. In one embodiment, the system determines if any of the candidate query fields are subject fields based on whether there are any queryable fields between an interrogative or lookup action entity in the query. A method for identifying the fields that are the subject of the query are described in more detail below with respect to FIG. 4.

Figure 4:
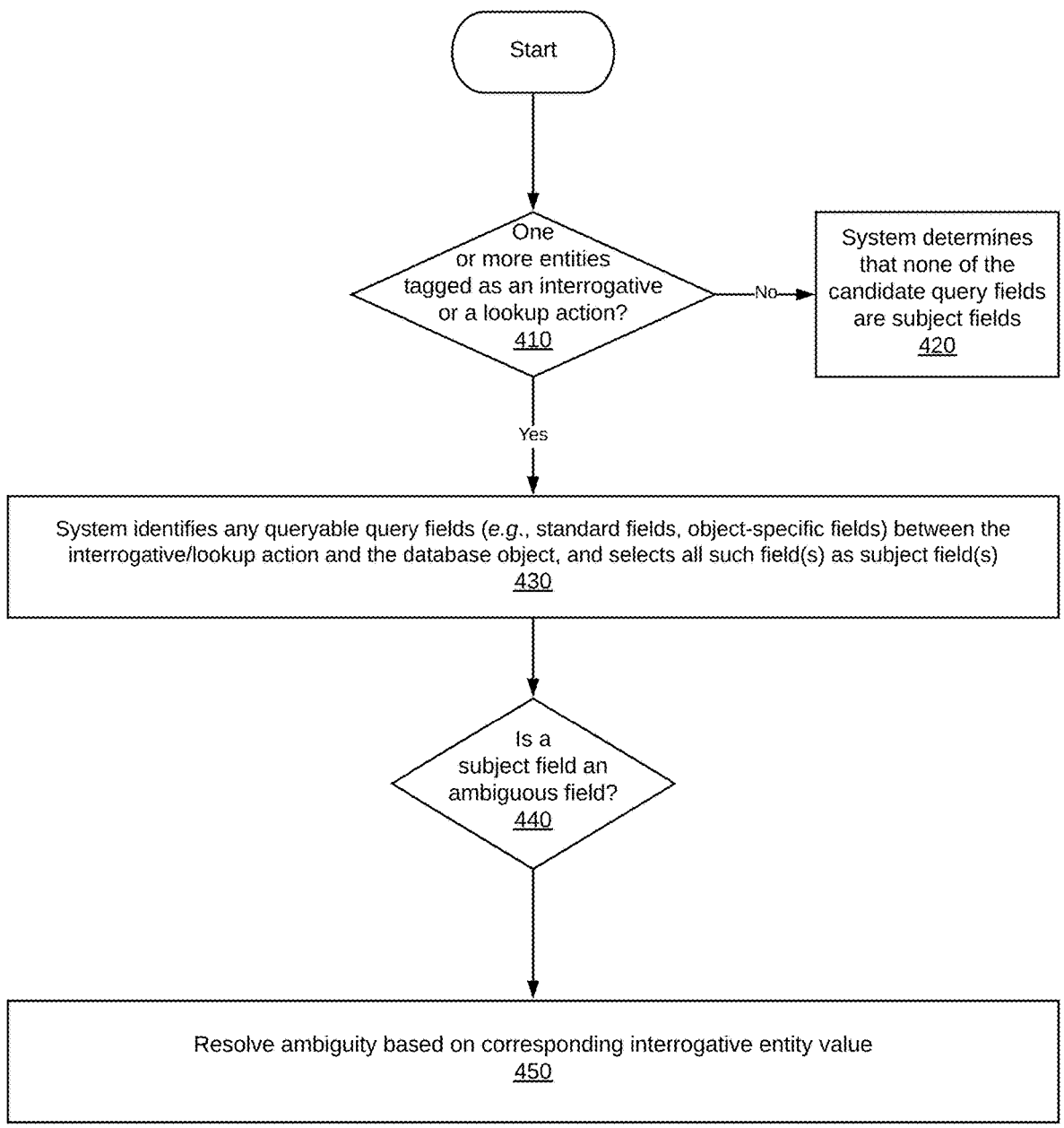
FIG. 4 is a flowchart that illustrates a method, according to one embodiment, for identifying which of the candidate query fields are the subject fields.

In the example query above, the system identifies both "createdBy" and "createdDate" as being subject fields due to the interrogatives "who" and "when" in the natural language query (see discussion related to FIG. 4). Consequently, the system adds the following subject fields to the query plan:

TABLE 4

Subject Fields

| Phrase | Type | Value | StartIndex | EndIndex |
|---|---|---|---|---|
| created | stand ardField | created By | 4 | 10 |
| created | standardField | createdDate | 4 | 10 |

For some user queries, subject query fields will not be identified at this stage and will not appear in the query plan, such as the case when the user is asking for instances of a database object. For instance, in the query, "show me the last 5 agreements I created," the user is asking the system for electronic copies of certain agreements. Therefore, among candidate query fields and operands for this query, there are no subject fields. Instead, the system inserts the applicable default subject field(s) when creating the database query from the query plan. In other words, if the user does not explicitly reference a subject field, the system retrieves a configure list of default field(s) based on the database object.

2.4 Matching Remaining Query Fields and Operands

At this point the database object and the subject fields (if any) have been identified. For a SQL query this means that the database object for the FROM statement and the database fields (if any) for the SELECT statement have been identified. Any remaining query fields and operands relate to other statements in a database query, such as a conditional expression (e.g., a WHERE statement), an ordering/sorting clause (e.g., an ORDERBY clause), and a limit on the number of records returned (e.g., a LIMIT statement).

In order to process the remaining query fields and operands for such clauses/statements, the system matches the remaining candidate query fields to operands based on the query parameters, the operand type of the operands (where the operand type of an operand is the entity type with which the operand is tagged by the NLU engine), and the location of the operands relative to the query fields (step 240). The query parameters are used to identify the operand type accepted by a query field, as well any specific matching rules pertaining to a query field or operand (e.g., certain fields may only match with operands appearing after the query field) An implementation of this step is described in more detail with respect to FIG. 3.

In the example query, the below candidate query fields are remaining after the subject fields have been removed:

TABLE 5

Query Fields

| Phrase | Type | Value | StartIndex | EndIndex |
|---|---|---|---|---|
| top | filterModifier | top | 16 | 18 |
| expire | quoteField | expire | 72 | 77 |

For the reasons set forth with respect to FIG. 3, the field "top" is matched to the operand "3," and the field "validUntilDate" is matched to the operand "in the next 24 months," as shown in the table below:

TABLE 6

Matched Query Fields and Operands

| Type | Value | Operator | Operand1 | Operand2 | Operand Description |
|---|---|---|---|---|---|
| filterModifier | Top | Equal | 3 | — | Record count |
| standardField | validUntilDate | Range | 2019-10-20T07:00:00.000Z | 2021-10-20T07:00:00.000Z | expire in the next 24 months |

This would leave the following operands unmatched after step 240:

TABLE 7

Unmatched Operands

| Phrase | Type | Value | StartIndex | EndIndex |
|---|---|---|---|---|
| From last year | Builtin.datetimeV2.daterange | 2018 Jan. 1 to 2018 Dec. 31 | 33 | 46 |
| Over | filterOperation | greater | 57 | 60 |
| $20k | builtin.number | $20k | 62 | 65 |

If any unmatched operands are remaining after step 240, than the fields corresponding to these operands in the user's query must be implicit. The query parameters specify default fields for operand types, and the system uses the query parameters to pair unmatched operands with default fields (step 250). Filter operation operands are associated with the closest following operand-query field pair and used to determine the operator associated with the pair. In the example query, the filter modifier "over" is used to apply the "greater than" operator to the match between "$20 k" and "net price."

In the example user query, the unmatched operands in Table 7 would be matched as follow:

TABLE 8

Default Field-Operand Matches

| Query Field Type | Query Field Value | Operator | Matching Operand1 | Matching Operand2 | Operand Description |
|---|---|---|---|---|---|
| standardField | createdDate | Range | 2018-01-01T07:00:00.000Z | 2018-12-31T07:00:00.000Z | from last year |
| standardField | netPrice | Greater | 20000 | — | over $20k |

"CreatedDate" is the default query field corresponding to "from last year." "NetPrice" is the default query corresponding to "$20 k."

The summary of the query field-operand matches from the example query are as follows:

The system adds the matched operands and query fields to the query plan as conditional parameters for a query (e.g., for the WHERE clause) (step 260). In one embodiment, contextual entities are added to the conditional parameters of a query, even if they are not part of the matching process above. For example, "recordName=Acme" may be added to the conditional parameters for the example query in the query plan. The contextual entities may be added to the conditional parameters in making the query plan or in step 170 when the system generates a query based on the query plan.

The system associates certain filter modifiers, such as "top," or "last," with a record count limit, and adds the record count limit to the query plan. They may be paired with a default record count operand or an explicit record count contextual entity (e.g., "3" in the example above).

2.5 Identify any Implicit Sorting or Ordering Parameters for the Query

If the query entities to do not include an explicit filter operand for ordering or sorting in the query results, the system determines if there are any implicit ordering and

TABLE 9

All Query Field-Operand Matches

| Query Field Type | Query Field Value | Operator | Matching Operand1 | Matching Operand2 | Operand Description |
|---|---|---|---|---|---|
| filterModifier | Top | Equal | 3 | — | Record count expire in the next 24 months |
| standardField | validUntilDate | Range | 2019-10-20T07:00:00.000Z | 2021-10-20T07:00:00.000Z | |
| standardField | createdDate | Range | 2018-01-01T07:00:00.000Z | 2018-12-31T07:00:00.000Z | from last year |
| standardField | netPrice | Greater | 20000 | — | over $20k | sorting criteria (step 260). In one embodiment, this comprise the following:

The system determines if any of the query fields in the conditional expression take a date range. If so, the system adds an order by element to the query plan, specifying that results should be ordered based on the value of the query field. The system adapts the ordering results based on the query to ensure records that have immediate time significance are placed ahead of less-immediate records based on the nature of the query. For example, if a user asks for objects expiring next quarter, the results will be returned in ascending order based on expiration date, so that the first-to-expire object will be listed first. If the user asks for objects expiring last quarter, the results will be returned in descending order based on expiration date, so that the most recently expired object will be listed first.

The system determines if the query includes entities such as top, highest, lowest. etc. If so, the system specifies the matching query field (explicit or default) in the order by criteria.

The system adds any identified ordering/sorting criteria to the query plan.

2.6 Example Query Plan

Below is a summary of the query plan for the example query.

| Query Plan | | | | |
|---|---|---|---|---|
| Intent | | | | |
| lookupQuote | | | | |
| Subject Fields | | | | |
| Phrase | Type | Value | StartIndex | EndIndex |
| created | standardField | createdBy | 4 | 10 |
| created | standardField | createdDate | 4 | 10 |

3. Example Method for Matching Candidate Query Fields to Operands

Figure 3A:
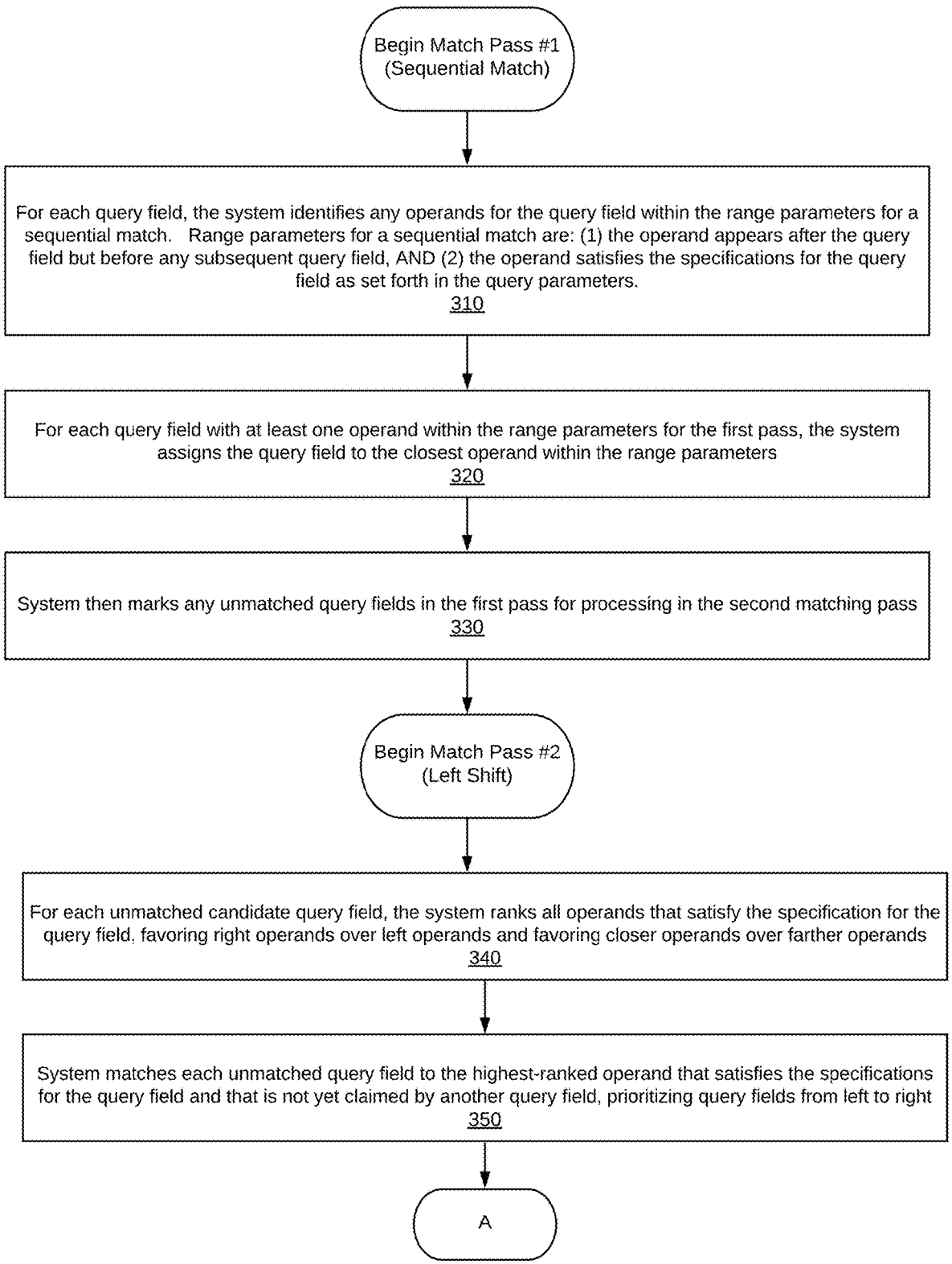
FIGS. 3A and 3B are flowcharts that illustrate a method, according to one embodiment, for matching candidate query fields to operands.
Figure 3B:
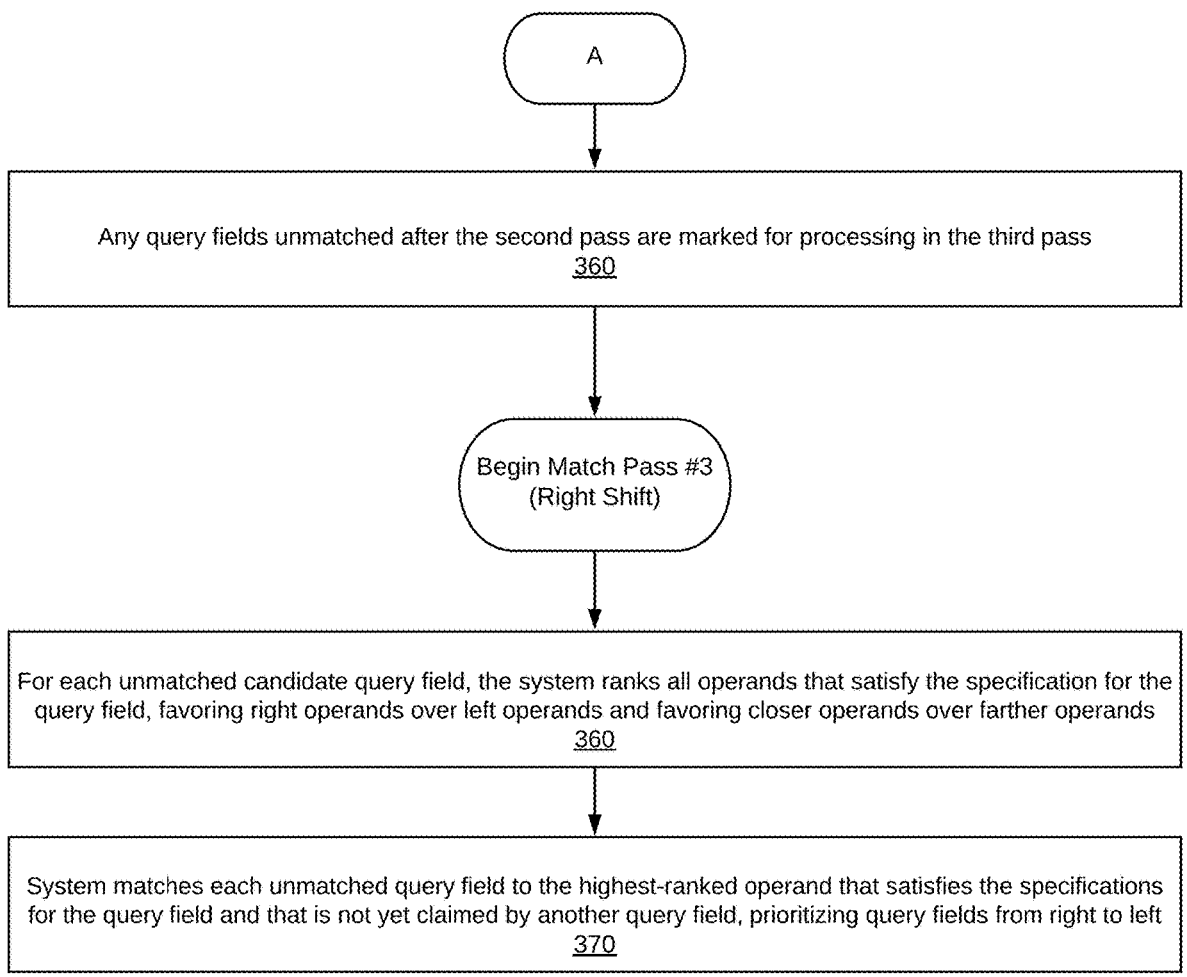

FIGS. 3A-3B illustrate an example method for matching candidate query fields to operands. This method includes three matching passes, referred to herein informally as "sequential match," "left pass," and "right pass."

3.1 Pass #1: Sequential Match

In matching query fields to operands, the most straight forward matches are when an operand of the correct type immediately follow a query field (e.g., "the top 3," or "expires in the next 24 months"). This is the idea behind the sequential match pass.

For each query field, the system identifies any operands for the query field within the range parameters for a sequential match (step 310). The range parameters for a sequential match are: (1) the operand appears after the query field but before any subsequent query field, AND (2) the operand satisfies the specifications for the query field as set forth in the query parameters. For example, the query parameters will specify the operand type accepted by the query field and may specify certain matching rules (e.g., "match only to operands after the query field").

For each query field with at least one operand within the range parameters for the first pass, the system assigns the query field to the closest operand within the range parameters (step 320). The system then marks any unmatched query fields in the first pass for processing in the second pass (step 325).

In the example query, the sequential match rules would result in the query fields "top" and "validUntilDate" being matched as follows:

| Conditional Statement | | | | | |
|---|---|---|---|---|---|
| Query Field Type | Query Field Value | Operator | Matching Operand1 | Matching Operand2 | Operand Description |
| standardField | validUntilDate | range | 2019-10-20T07:00:00.000Z | 2021-10-20T07:00:00.000Z | expire in the next 24 months |
| standardField | createdDate | range | 2018-01-01T07:00:00.000Z | 2018-12-31T07:00:00.000Z | from last year |
| standardField | netPrice | greater | 20000 | — | over $20k |
| Contextual entity | recordName | equals | Acme | | Acme |

Sorting and Ordering
sortBy netPrice
Record Count
3

| Type | Value | Operator | Operand1 | Operand2 | Desc | Comments |
|---|---|---|---|---|---|---|
| filterModifier | Top | Equal | 3 | — | | CORRECT match |
| standardField | validUntilDate | range | 2019-10-20T07:00:00.000Z | 2021-10-20T07:00:00.000Z | expire in the next 24 months | CORRECT match |

Since the system was able to match both remaining query fields in the first pass, the system would not need to proceed with the second and third passes in the case of the example query. However, there are many queries for which the second and third passes are applicable.

3.2 Pass #2: Left Shift

For each unmatched query field after the first pass, the system ranks all operands that satisfy the specification for the query field (step 330). In one embodiment, the system ranks the operands by running a typical sorting algorithm on the operands with a comparator comparing two operands at a time, wherein the comparator works as follows:

If both operands being compared are to the right of the unmatched query field, rank the closer operand higher than the farther operand;

If both operands being compared are to the left of the unmatched query field, rank the closer operand higher than the farther operand;

If one operand is on the left and the other is in the right, rank the operand on the right higher if it is within a threshold number of characters to the query field. If the operand on the right is outside the threshold numbers of characters, rank the operand to the left higher if it is closer (else default to the right operand).

In this embodiment, an operand that is on the "left" of a query field, has a lower start index than the query field, and an operand that is on the "right" of a query field has a higher start index than the query field.

The system matches each unmatched query field to the highest-ranked operand that satisfies the specifications for the query field and that is not yet claimed by another query field, prioritizing query fields from left to right (i.e., prioritizing query fields by lowest start index) (step 340). Any query fields unmatched after the second pass are marked for processing in the third pass (step 350).

3.3 Pass #3: Right Shift

For each unmatched query field after the second pass, the system ranks all operands that satisfy the specification for the query field in accordance with the sorting algorithm described above (step 360).

The system matches each unmatched query field to the highest-ranked operand that satisfies the specifications for the query field and is not yet claimed by another query field, prioritizing query fields from right to left (step 370).

4. Example Method for Identifying the Subject(s) of the Query

FIG. 4 illustrates a method, according to one embodiment, for identifying which of the candidate query fields are the subject fields. The system determines if any of the entities associated with the query are tagged as an interrogative or a lookup action (step 410). Examples of interrogatives are the words "who," "what," and "when." Examples of a lookup action are "show me" and "tell me." If there are no interrogatives or look up action entities in the user query, the system determines that there are none of the candidate query fields are subject fields (step 420).

If one or more of the entities are tagged as interrogatives or a lookup action, the system identifies any queryable query fields (e.g., standard fields, object-specific fields) between the interrogative/lookup action and an entity corresponding to the database object (e.g., an entity tagged "object name"), and selects all such field(s) as subject field(s) (step 430). If a subject field is an ambiguous field and there is an interrogative entity, the system resolves any ambiguities based on the value of the interrogative (steps 440, 450). For example, if the subject query field is "created," which may have the value createdBy or createdDate, and the interrogative before the subject query field is "who," the ambiguity will be resolved as "createdBy." Likewise, if the interrogative before the field is "when" the ambiguity will be resolved as "createdDate." In one embodiment, "what" is also resolved in favor of date fields. If there is a second interrogative after the database object (and there is no second database object), then the ambiguity will be resolved in favor of both ambiguous field values.

For instance, take the example query: "Who created the top 3 Acme quotes from last year that are over $20 k that expire in the next 24 months and when?" As discussed above, the query has following candidate query fields:

| Phrase | Type | Value | StartIn | EndIndex |
|---|---|---|---|---|
| Created | standardField | created | 4 | 10 |
| Top | filterModifier | top | 16 | 18 |
| Expire | quoteField | validuntilDate | 72 | 77 |

There are two interrogatives in the query, "who," and "when." "Created" and "top" are the two query fields between the interrogative "who" and the object "quotes." Since "created" is of type "standardField", which is a queryable field, the system identifies "created" as the subject field. "Top" is of the type "filterModifier," which is not a queryable field and, therefore, cannot be a subject field.

"Created" is an ambiguous field that can have value "createdBy" or "createdDate." Because of the interrogative "who," the system will resolve this ambiguity in favor or "createdBy." However, because there are no query fields or database objects after the interrogative "when," the system will assume that this interrogative also corresponds to "created" and also add "createdDate" as a subject field.

5. Example System Architecture

Figure 5:
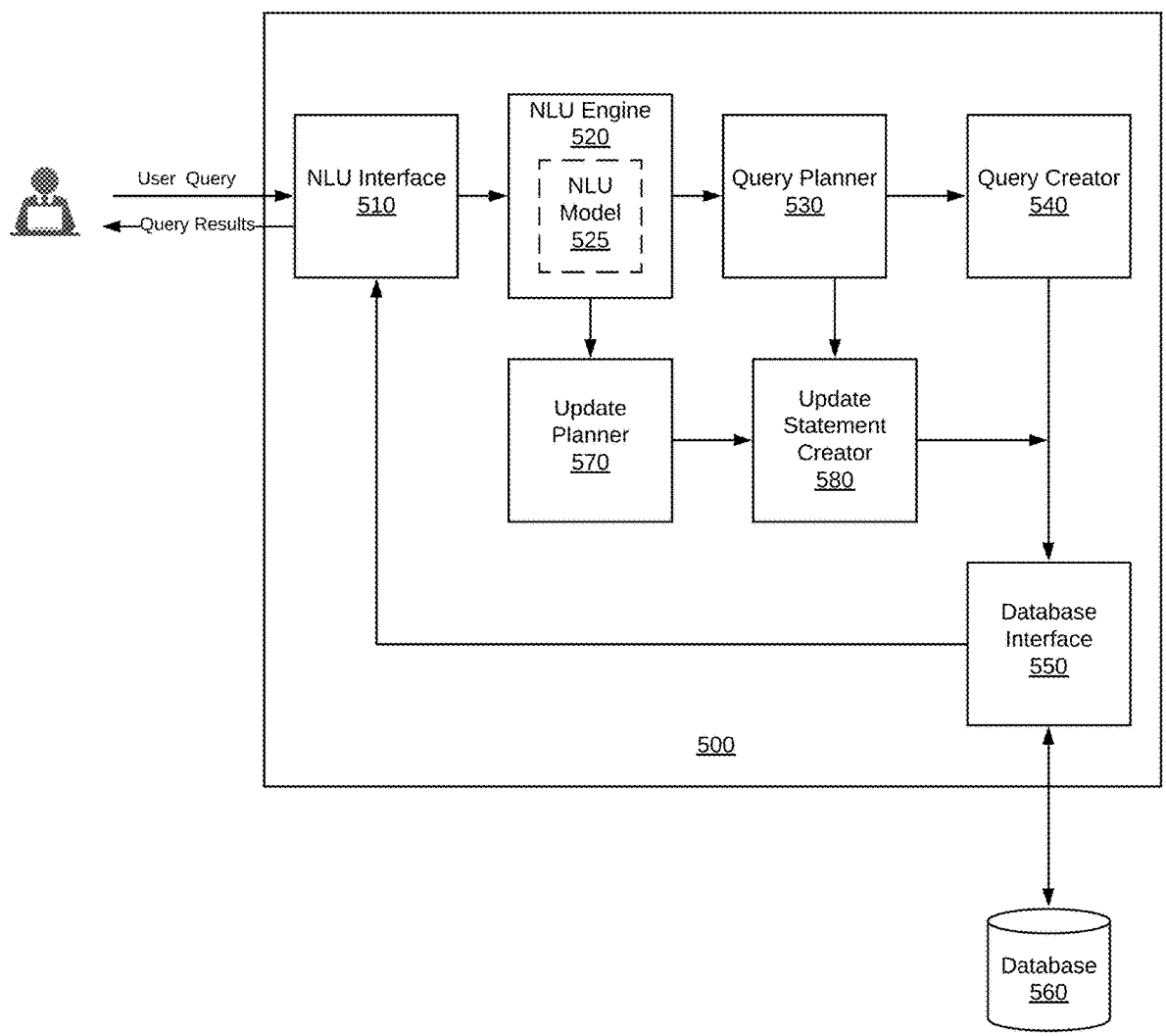
FIG. 5 is a block diagram that illustrates an example software architecture according to one embodiment.

FIG. 5 illustrates an example system architecture for performing the methods described herein. The methods described herein may be implemented in a system configured differently and are not limited to the system architecture illustrated in FIG. 5.

Example system 500 includes a NLU Interface 510, which enables a user to input a natural language query to the system. An NLU Engine 520 applies an NLU model 525 to a user's natural language query, and Query Planner Module 530 creates a query plan in accordance with the method of FIG. 2. Query Creation Module 540 creates a database query based on the query plan, and provides the database query to Database Interface 550 which serves as an interface to the queried database 560. Query results are return to the NLU Interface 510, which provides the query results to the user.

Update Planner Module 570 creates an update plan for natural language database update requests as described with respect to FIGS. 7-9 below. Update Statement Creator Module 580 creates a structured database update statement from the update plan (and, when applicable, from a query plan too).

Those skilled in art will appreciate the system 500 may include additional modules, not relevant to the methods described herein, for providing B2B application functionality.

In one embodiment, system 500 is any system that is backed by or uses a database, such a customer relationship management (CRM) system or a quote-to-cash system. Quote-to-cash systems integrate and automate end-to-end sell-side processes, from creating a quote for a prospective customer to collecting revenue and managing renewals. For example, quote-to-cash systems facilitate sales transactions by enabling users to configure products, price products, generate quotes, provide product recommendations, create and sign contracts, manage billings, and perform other sell-side business functions. An example of a quote-to-cash system is the APTTUS quote-to-cash suite of products running on the SALESFORCE platform. In one embodiment, a quote-to-cash system is any system that performs at least one or more of the following business functions: (1) configure, price, and quote; (2) contract generation and management; (3) revenue management (e.g., billing and financial reporting); and (4) product recommendations (e.g., identifying upsell and cross sell opportunities) and other machine learning recommendations to optimize the sales process.

6. Updating a Database Via a Natural Language Interface

In a further embodiment of the system, the user is able to update a database via a natural language interface. FIGS. 7-10, and the corresponding description, relate to a system, method, and computer program for converting natural language update instructions into structured database update statements. Below are examples of natural language update instructions in a B2B application:

"Update the send date to next year for recent Acme quotes that are over $500 k"

"Set start date to Monday."

"Update ABC license to 250."

"Increase the discount on my recent Acme quotes that are over $500 k by 5%."

"Push the start date out for the last IBM agreement by two weeks."

"Bump up the ABC license by 15."

A structured database statement requires specific syntax and delineates the database object that will be updated, the field(s) that will be updated, the corresponding update value(s), and any conditional parameters that specifies the specific instance(s) of the database object that will be updated (e.g., the specific records or rows in the database). A SQL update statement is an example of a structured database statement. Below is the format for a typical SQL update statement:

UPDATE object SET field1=value 1, . . . fieldn=valueN WHERE clause-1 operator . . . clause-n operator In this statement:

Object is the entity being updated

Field 1 . . . field N are update fields

Value 1 . . . valueN are update values

Figure 7:
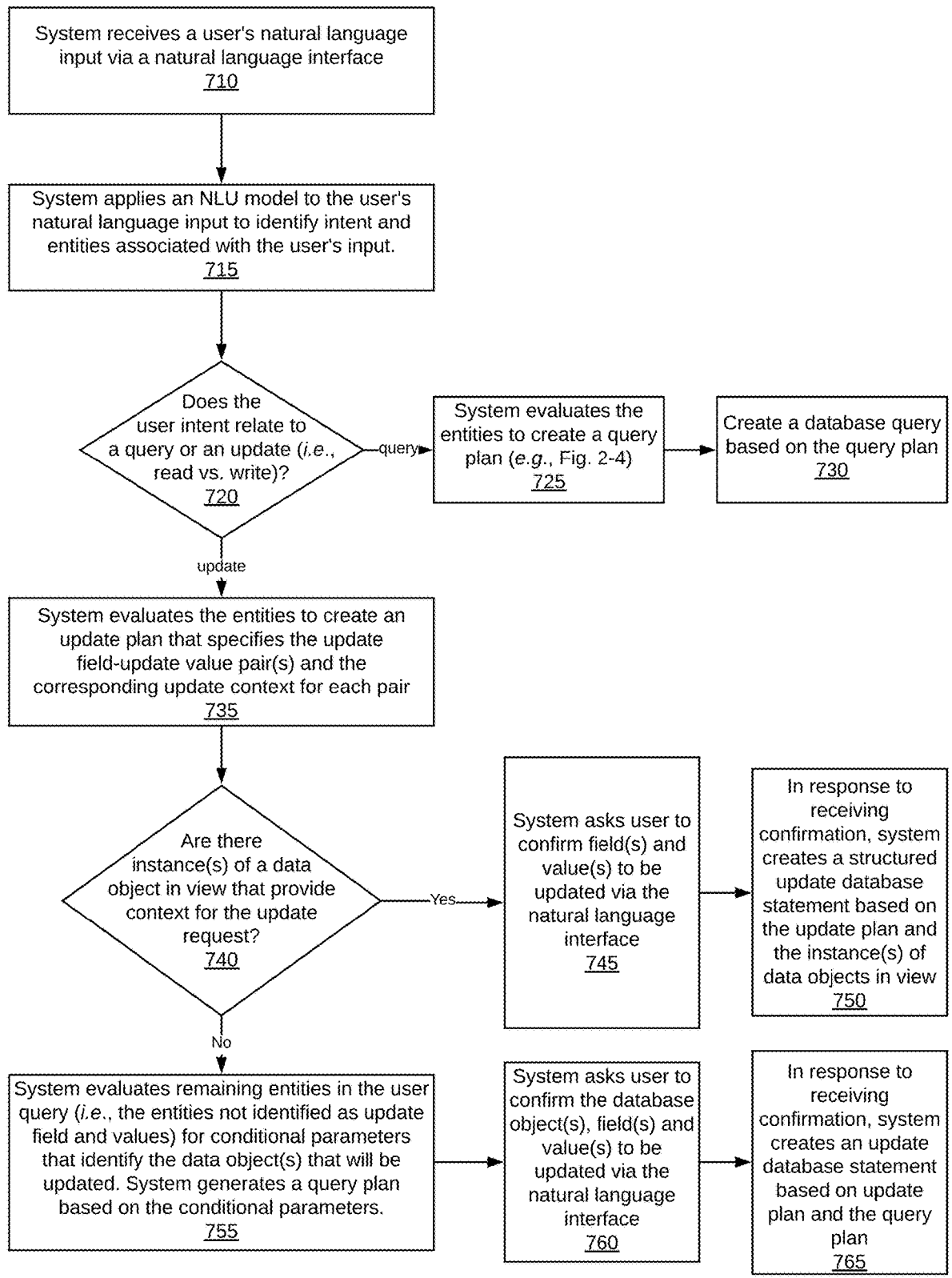
FIG. 7 is a flowchart that illustrates a method, according to one embodiment, for converting natural language update instructions into structured database update statements.
Figure 8A:
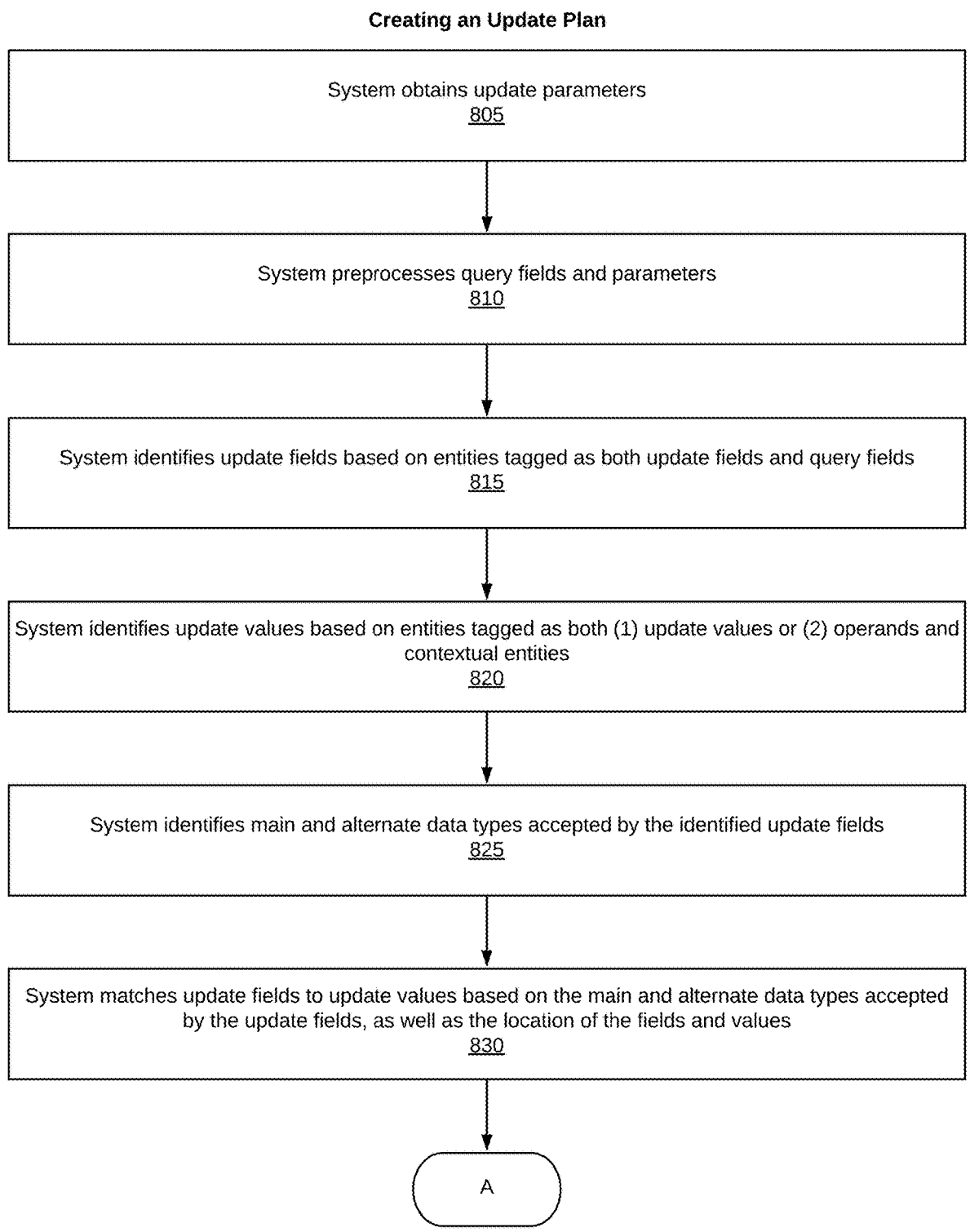
FIGS. 8A-8D are flowcharts that illustrate a method, according to one embodiment, for creating an update plan.
Figure 8B:
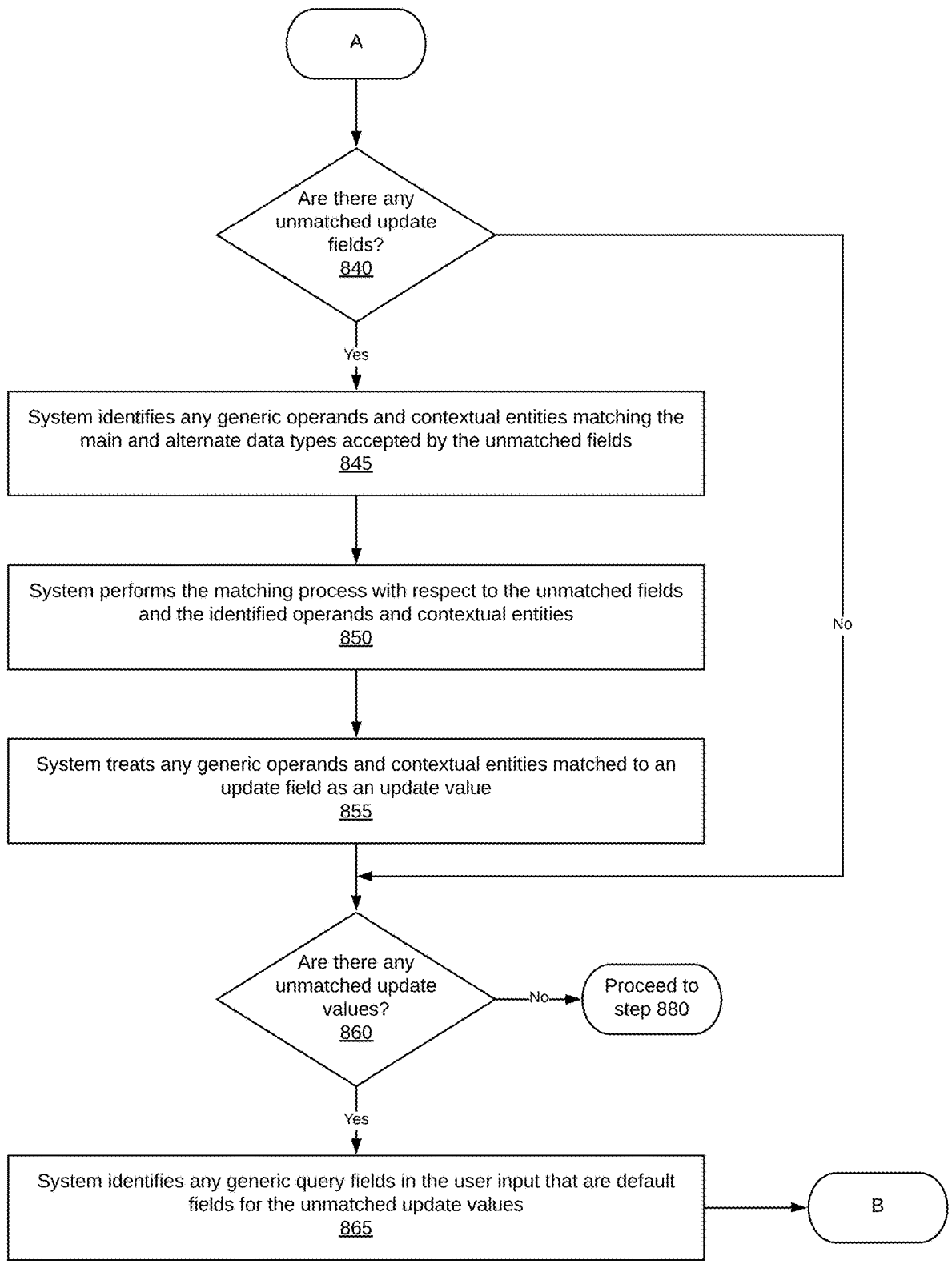
Figure 8C:
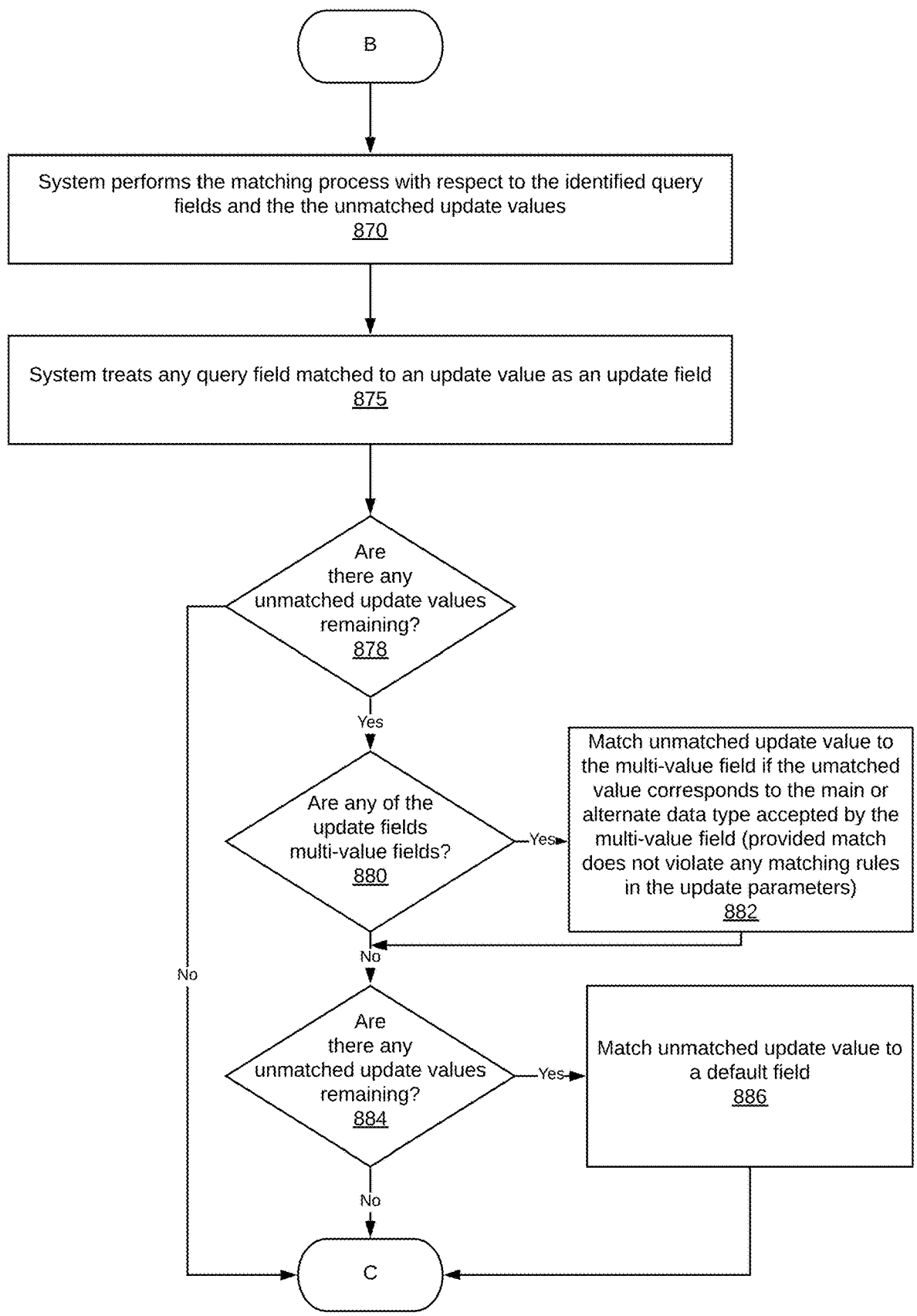
Figure 8D:
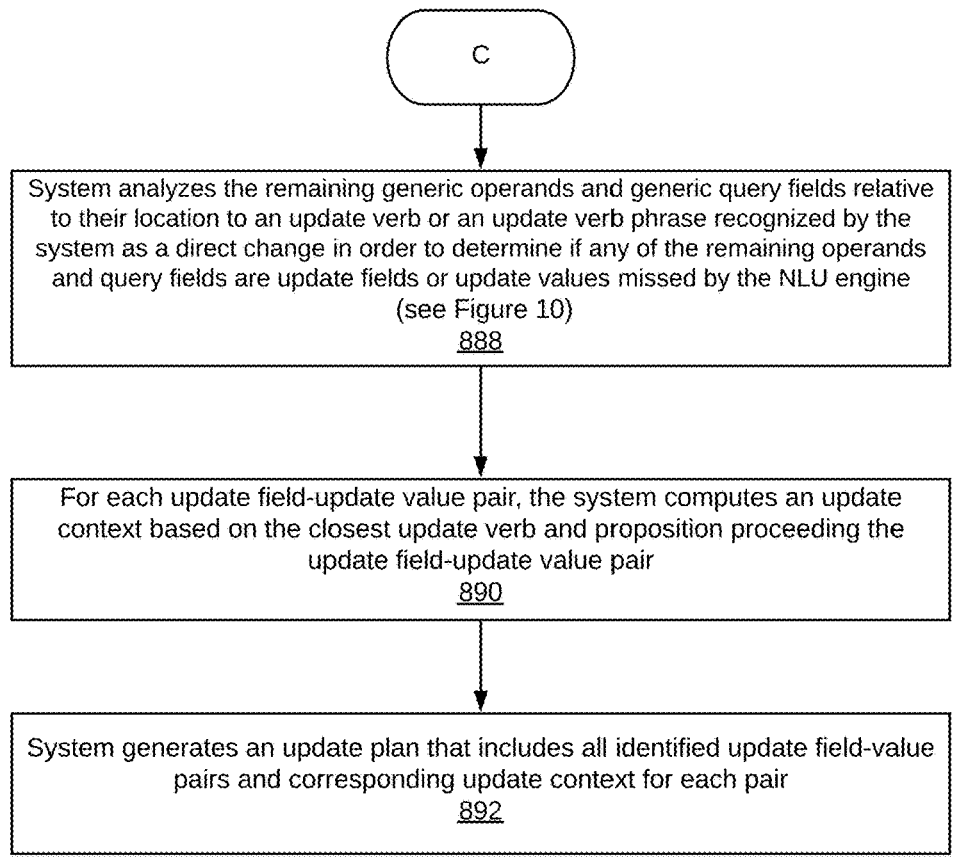

Clause-1 . . . clauseN are conditional parameters that define the specific instances of the object that will be updated 6.1 Creating a Structured Database Update Statement FIG. 7 illustrates a method for converting a natural language update instruction into a structured update database statement. The system receives a user's natural language input via a natural language interface (e.g., text message interface, audio interface, etc.) (step 710). A natural language understanding (NLU) engine within the system applies an NLU model to the input to identify an intent and entities associated with the input (step 715). As stated above, an NLU model is a machine-learning model that learns user intent and entity classifications based on training data (e.g., labeled natural language user input).

6.1.1 Identifying the User's Intent

The intent is the action the NLU engine predicts that the user wants to take, for example, to look up a quote or update a quote. The NLU model is trained to identify intents based on a training set of queries and update instructions labeled with an intent. In one embodiment, there are two types intents associated with a database update:

Update Field Intent: Intent of the user' natural language input is to update specific instances of a data object that are "in view." An instance of database object is considered in view if during a session a user has queried the system for information for the instance of the database object. For example, assume a user has queried the system for a specific agreement, and the system has returned information to the user regarding the specific agreement (e.g., the system displays a card in a text message interface with summary information for the agreement). The specific agreement returned is an instance of the "Agreement" object. The specific agreement returned is considered "in view." Now assume that that the next user input in the same user session is "set start date to one month from now and end date to one year since then." In this case, it can be inferred from the context of the interactions that the user's intent is to update the start and end date of the agreement in view. In an audio interface, an instance of a data object is in view if audio information is returned regarding the instance of the data object.

Update Object Intent: Intent of user natural language input is to update a database object, and there are no instances of a database object in view. The user utterance specifies the update criteria, as well as the filter criteria for the instance(s) of a data object to be updated.

6.1.2 Evaluating Entities to Create an Update Plan or a Query Plan

If the identified intent is a type of database query (as opposed to an update intent), the system evaluates the entities to create a query plan as described above with respect to FIG. 2 (step 725). The system then creates a structured database query based on the query plan (step 730).

If the identified intent is to update a database object, the system evaluates the entities in the user input to create an update plan that specifies one or more update field-value pairs and the corresponding update context (i.e., absolute or relative) for each pair (step 735). As stated above, the system uses an NLU model to tags entities in the user input with an entity type. The entities correspond to the parameters of the user's update request. In certain embodiment, the NLU model is trained with training data to identify the following types of entities in association with an update intent (in addition to the types of entities discussed above with respect to FIGS. 1-6):

Update Field Entity: A query field in a database object that will be updated.

Update Value Entity: An operand that is to be used for the update.

Update Verb Entity: A verb that specifies the update (e.g., push, change, set update)

Even though certain entities may be tagged as update fields or update values, the system evaluates the entities further in step 735 because the NLU tags may be incorrect or incomplete (for many of the challenges described in the Background section), and the NLU model does not understand the update context. A method for further evaluating the entities to create an update plan is described with respect to FIG. 8 below.

6.1.3 Identifying the Data Object that Will be Updated

In addition to creating the update plan, the system determines whether there are instance(s) of a data object in view that provide context for the update request (e.g., update fields corresponds to fields in the object in view) (step 740). For example, if prior to the update request, the user queried the system for one or more instances of a data object (e.g., particular quotes or agreements), such instance(s) of the data object are in view. If there are instance(s) of a data object in view that provide context for the update request, the system asks the user to confirm the system's understanding of the changes to be made to the instance(s) of the data object in view (i.e., to confirm the update fields and update values in the update plan for the instance(s) in view) (step 745). For example, in a text messaging interface, the system may display a card with summary information for each instance of a data object to be updated, where the system's understanding of the changes that will be made are highlighted in some graphical form (e.g., bolded, underlined, in different color font, etc.). In response to receiving confirmation, the system creates a structured update database statement based on the update plan and the instance(s) of the database objects in view (step 750), If there are no instance(s) of a data object in view that provide context for the update request, the system evaluates the remaining entities in the user query (i.e., the entities not identified as an update fields and values) for conditional parameters that identify the data object(s) (i.e., the instances of a data object) to be updated (step 755). More specifically, the system generates a query plan based on the conditional parameters as described above with respect to FIGS. 1-6, where the query plan specifies the database object(s) to be updated. The system then asks the user to confirm the database object(s), field(s), and value(s) to be updated via the natural language interface (step 760). In response to receiving confirmation, the system creates a structured update database request based on the update plan and the query plan (step 765), and the database is updated accordingly. In creating the structured database update statement, the system maps update fields in the update plan and query fields in the query plan to actual database fields using a simple mapping of query/update field names to database fields. For each update/query field, it then creates the applicable expression/statement within the database query using the applicable database field and the corresponding operand and operator associated with the query field. For each query field corresponding to a conditional expression, the system creates a simple condition for the database query using the mapped database field and corresponding operator and operand. All the simple conditions are combined for the actual conditional expression in the database query (e.g., all the where clause conditions are ANDed with each other to form an actual WHERE clause).

6.2 Creating an Update Plan

FIG. 8 illustrates a method for creating an update plan. The system obtains update parameters (step 805). Like the query parameters, update parameters include specifications for standard fields and object-specific fields, as well as default fields for operand types. The update parameters specify the main data type accepted by the update field. If an alternate data type is also accepted by the field, this is also set forth in the update parameters. The update parameters also specify default fields for operand types. The update parameters may also include matching rules for a field (e.g., "match only to operands to the right of the update field"), In one embodiment, the update parameters are determined by a developer of the system, and the system accesses the applicable update parameters from a list or library of update parameters. In one embodiment, update parameters are defined for each database object.

The system preprocess query fields (which include update fields) and operands as described with respect to step 220 above (step 810).

6.2.1 Identifying Explicit Update Field-Value Pairs

The system then identifies the entity or entities in the user input that are update fields and update values. For update fields, the system looks for entities that are tagged as both update fields and query fields, and classify such entities as update fields (step 815). Adjacent update fields are aggregated into one. For example, in the natural language update request, "update line item owner to Jack Ryan. "If both "line item" and "owner" are tagged as update and query fields, "owner" will be treated as the update field and "line item" will be ignored.

For update values, the system looks for entities that are tagged as both (1) update values and (2) operands or context entities (step 820). Such entities are identified as update values. From the update parameters, the system identifies the main and alternate data types accepted by the identified update fields (step 825). The system matches update fields to update values based on the main and alternate date types accepted by the update fields, as well as the location of the update fields and update values (step 830). Update values with main data types within the matching range of an update field are preferred over update values with alternate data types. An example of the matching process is described with respect to FIG. 9.

6.2.2 Identifying Generic Operands that are Update Values

After step 830, there may still be unmatched update fields. If so, the system identifies any generic operands and contextual entities matching the main and alternate data types accepted by the unmatched field(s) (step 845). Generic operands and contextual entities are entities tagged by the NLU engine as an operand or a contextual entity but not as an update value. The system then attempts to pair each unmatched update field to one of the identified generic operands or contextual entities (step 850). As stated above, an example of the matching process is illustrated in and described with respect to FIG. 9. The system treats any generic operands and contextual entities matched to an update field as an update value (step 855).

6.2.3 Identifying Generic Query Fields that are Update Fields

After steps 830 or steps 860, there may be unmatched update values. The update parameters specify default update fields for operand types, and, if there are unmatched update values, the system uses the update parameters to identify generic query fields in the user input that are also default field(s) for the unmatched field value(s) (step 865). For purposes of this step, generic query fields are entities in the user input that are tagged by the NLU engine as query fields (standard or object-specific), but not update fields. The system then matches unmatched update values to the identified generic query fields, first based on the main data type accepted by the query field and then by the alternate data type accepted by the query field. In one embodiment, the matching is performed from left to right (i.e., moving from lowest start index to highest start index). The system treats any generic query field matched to an update field value as an update field (step 875).

6.2.4 Identifying Values for Multi-Value Fields

If there is still an unmatched updated value after step 875, the system determines where any of the update fields are multi-valued fields (i.e., fields accepting multiple values) and whether the unmatched update value corresponds to the main or alternate data type accepted by a multi-value field (steps 878, 880). If so and if the match complies with any matching rules in the update parameters, the system pairs the unmatched update value with the multi-valued update field (step 882). For example, assume an "opportunity" object has an "opportunity team member" field that can accept multiple values, and the user's natural language input is "add John and Bob as team members to the first opportunity." In this case, both "John" and "Bob" would be matched to the "opportunity team member" field.

6.2.5 Identifying Implicit Fields

If there is still an unmatched update value after step 882, the system uses the update parameters to identify the default query field for the value type corresponding to the unmatched value (steps 884), The system then matches the unmatched value to the identified default query field, resulting in the system treating the default query field as an update field (step 886).

6.2.6 Determining Whether any Remaining Generic Fields or Operands are Update Fields or Values At this point, the system has attempted to process and match all the entities tagged as an update field or an update value. However, there may be generic operands or generic query fields remaining that are in fact update fields or update values even though they were not tagged as such by the NLU engine or upgraded to an update value or an update field as part of the above matching steps. For instance, this may occur when a user uses the pronoun "it" to reference an update field, or when an entity could be a reference to either a field or a value. For example, assume that an agreement object has a "perpetual" field which can have the values "true" or "false" and consider the following user instructions:

"Make it perpetual"

"Change perpetual"

In the first instruction, "it" references to the "perpetual" field and "perpetual" refers to the value of the field in that in that the user wants to make the term of the agreement perpetual. In the second instruction, the "perpetual" entity refers to the field, as the user is indicating that he/she wants to change the value of the "perpetual" field. However, the user has not indicated what the value is. In either scenario, the NLU engine may simply tag "perpetual" as a generic query field or generic operand or both.

Figure 10:
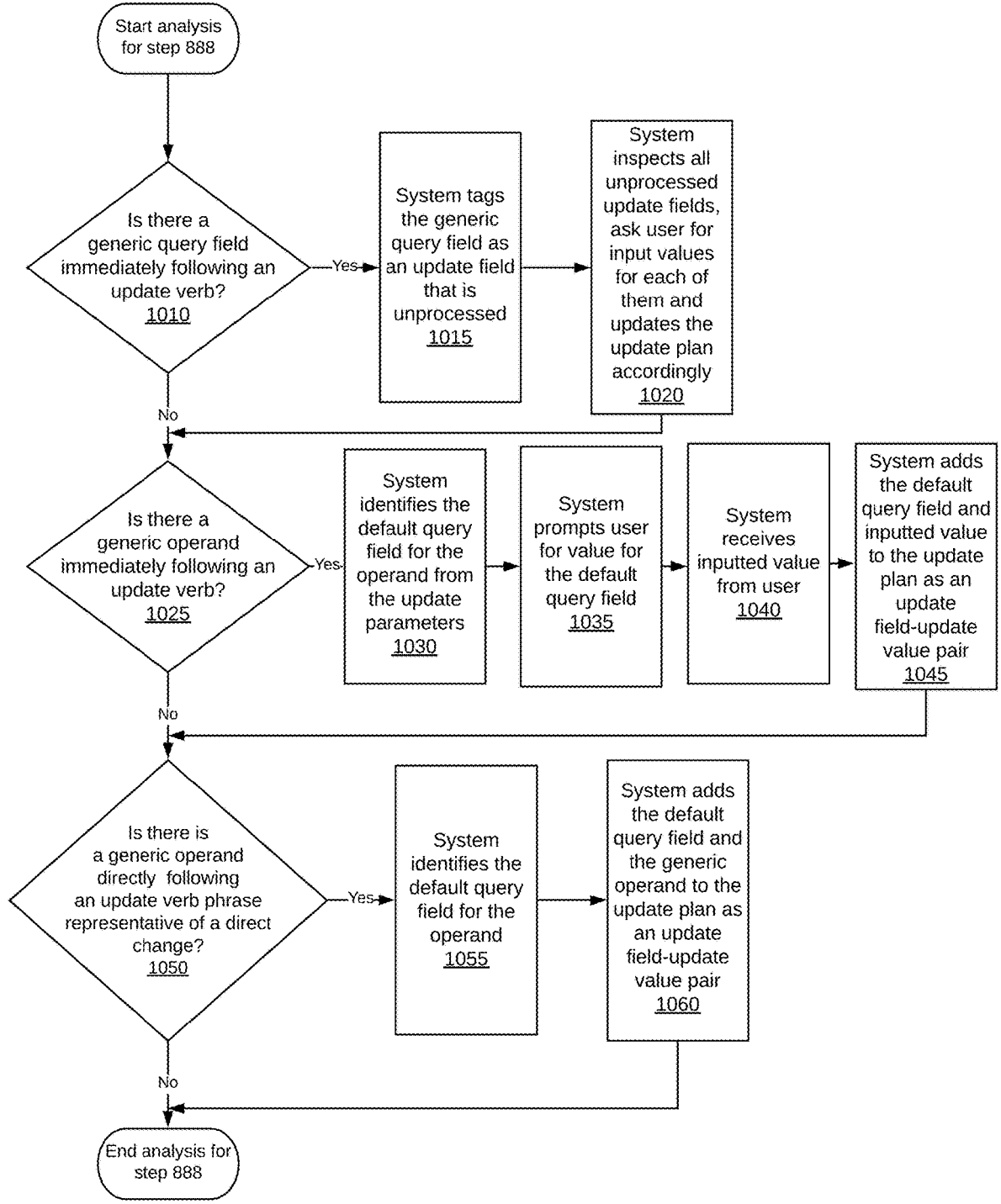
FIG. 10 is a flowchart that illustrates a method, according to one embodiment, for identifying remaining generic fields and operands that are update fields and operands.

To handle this type of scenario, the system analyzes the remaining generic operands and generic query fields relative to their location to an update verb or an update verb phrase recognized by the system as a direct change in order to determine if any of the remaining operands and query fields are update fields or update values missed by the NLU engine (i.e., not tagged as an update field or an update value) (step 888). FIG. 10 illustrates a method for performing this type of processing. The method is described relative to examples of an "agreement" object with a "perpetual" field that takes "true" and "false" as values and a "format" field that takes "docx," "pdf," etc. as values.

Referring to FIG. 10, the system determines if there is a generic query field immediately following an update verb, such as in the case with the natural language input "change format" (step 1010). If so, the system tags the generic query field as an update field that is unprocessed (step 1015). The system then inspects all unprocessed update fields and asks the user for input values for each of them, and updates the update plan accordingly (step 1020).

In step 1025, the system determines whether there is a generic operand following an update verb (e.g., "change docx" or "change perpetual"). If so, the system identifies the default query field for the generic operand from the update parameters (step 1030). For example, in the command "change docx," "docx" is an operand that immediately follows the update verb "change," and the default query field is "format." In this case, the user is not specifying a value for "format" query field, but indicating they want to make a change to the format field. The system then prompts the user for a value for the default query field (step 1035), receives the inputted value from the user (step 1040), and adds the default query field and inputted value to the update plan as an update field-update value pair (step 1045). With respect to the above example, the system may provide a user with a list of format options, and then change the format field in accordance with the user's input.

In step 1050, the system determines whether there is a generic operand directly following an update verb phrase (e.g., an update verb in combination with a preposition or pronoun) that the system is configured to recognize as a direct change to a field value, such as, for example, "make it," "change to," and "set as." If so, the system determines the default query field for the generic operand from the update parameters (step 1055), and adds the default query field and the generic operand to the update plan as an update field-update value pair (step 1060). For example, if the user says "make it a pdf," the system would determine that "format" is the default field for "pdf" and add "format=pdf" to the update plan as a update field-update value pair.

6.2.7 Computing an Update Context for Each Update Field-Update Value Pair

For each update field-update value pair in the system, the system computes an update context based on the closest update verb and preposition proceeding the update field (step 890). The update context indicates whether the update is absolute or relative to an existing field value. An absolute update is not related to an existing field value. In an absolute update, the update value is the new value of the corresponding update field. In a relative update, the update is relative to an existing value, and the update value indicates the amount that the existing value in the update field will change. Below are example of absolute update instructions:

"Set start date to next Monday."

"Update the ABC license to 250."

Below are example of relative update instructions:

"Increase the discount on my recent Acme quotes that are over $500 k by 5%."

"Push the start date out for the last IBM agreement by two weeks."

"Bump up the ABC license by 15."

In one embodiment, the system is configured to identify certain update verb and preposition combinations as absolute updates and certain update verb and preposition combinations as relative updates. For example, the system may be configured to identify the combination of the verb "set" and the preposition "to" as an absolute update, and the combination of the verb "increase" and "by" as a relative update. For update field-update value pairs created as a result of the method of FIG. 10, where there may not be a proceeding preposition, the update context is set to absolute.

6.2.8 Generating an Update Plan

The system generates an update plan that includes all identified update field-update value pairs and the corresponding update context for each pair (step 892). Below are example natural language update instructions and the corresponding information that would be in the update plan:

Example 1

Natural Language Input: "Set start date to one month from now and expiration to 4 weeks since then." (For this example, assume the current date is Jun. 9, 2020).

Update Plan Information:

| Update Fields | Update Verb | Preposition | Update Value (operand) | Update Context |
|---|---|---|---|---|
| Start date | Set | to | One month from now = 2020 Jul. 09 | Absolute |
| Expiration (validUntilDate) | set | to | 4 weeks since then = 2020 Aug. 28 | Absolute |

Example 2

Natural Language Input: "Increase the discount on my recent Acme quotes that are over $500 k by 5%."

Update Plan Information:

| Update Fields | Update Verb | Preposition | Update Value (operand) | Update Context |
|---|---|---|---|---|
| Discount | Increase | by | 5% | Relative to current value in Discount field. |

In Example 2, the entities related to "recent Acme quotes that are over $500 k" would be processed in creating a query plan, which would be used to generate the conditional parameters of the update statement.

6.3 Method for Matching Update Fields to Update Values

Figure 9:
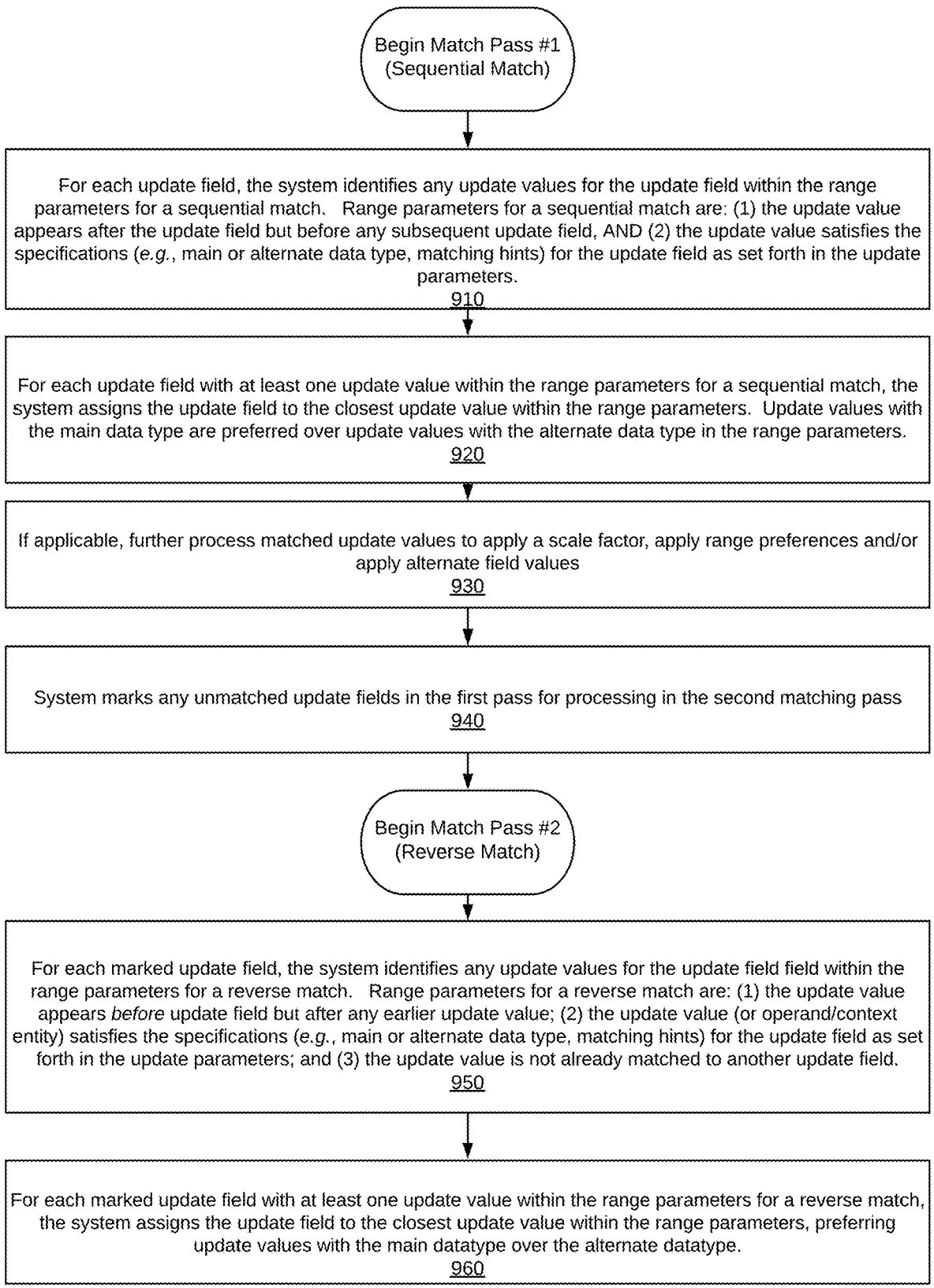
FIG. 9 is a flowchart that illustrate a method, according to one embodiment, for matching update fields to update values.

FIG. 9 illustrates an example method for matching update fields to update field values. The system first does a sequential match pass from left to right (e.g., lowest index to highest index). Specifically, for each entity tagged by the system as an "update field," the system identifies any entities tagged by the system as "update value" that are in the range parameters of the update field for a sequential match (step 910). Range parameters for a sequential match are: (1) the update value appears after the update field but before any subsequent update field, AND (2) the update value satisfies the specifications (e.g., main or alternate data type, matching hints) for the update field as set forth in the update parameters.

For each update field with at least one update value within the range parameters for a sequential match, the system assigns the update field to the closest update value within the range parameters (step 920). If applicable, the system further processes the matched update value to apply a scale factor, apply range preferences, and/or apply alternate field values for an update (as opposed to the value that would be used for a query) (step 930). Below are examples:

Scale Factor: converting years to month (e.g., if the user input is "set term to 2 years" and the term is measured in months, then the value "2 years" is converted to 24 months).

Range preferences: For start date, prefer the beginning of the year. For example, if the update value is "next year" and the update field is "start date" use January 1, 2xxx, whereas if the update field is "end date" use December 31, 2xxx.

Alternate field values: For a query, the term "one month from now" may be treated by the system as a range (e.g., July 1-July $30^{th}$), whereas for an update, the system may treat "one month from now" as a specific date (e.g., July $8^{th}$).

The system then marks any unmatched update fields in the first pass for processing in the second match pass (step 940).

The system does a second match pass in the reverse direction as the first pass (e.g., from highest index to lowest index). For each update field that is unmatched after the first pass, the system identifies any unmatched update values for the unmatched update field that are within range parameters for a reverse match (step 950). Range parameters for a reverse match are: (1) the unmatched update value appears before the unmatched update field but after any earlier unmatched update field value; AND (2) the unmatched update value satisfies the specifications (e.g., main or alternate data type, matching hints) for the update field as set forth in the update parameters. For each unmatched update field with at least one unmatched update value within the range parameters for a reverse match, the system assigns the update field to the closest unmatched update value within the range parameters (step 950).

The matching process of FIG. 9 also can be used when attempting to match update fields to generic operands and contextual entities and to match update values to generic query fields.

7. General

The methods described herein are embodied in software and performed by one or more computer systems (each comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for creating a database update statement from a user's natural language input, the method comprising:
   receiving a user's natural language input via a natural language interface to the system;
   applying a natural language model to the user's input to identify an intent and a plurality of entities associated with the user's input, wherein the entities are tagged with an entity type and wherein the entity types include an update verb and corresponding preposition;
   determining that the intent relates to an update request for a database;
   evaluating the entities to identify update fields and corresponding update values for the update statement;
   for each update field and update value pair, identifying an update context for the pair based on an update verb and corresponding preposition proceeding the pair;
   generating an update plan that specifies the update field-update value pairs and the corresponding update context for each pair;
   determining whether there are instance(s) of a data object in view that provide context for the user's natural language input;
   in response to there being instance(s) of a data object in view that provide context for the user's natural language input, performing the following:
      asking the user to confirm the update field(s) and update value(s) in the update plan;
      in response to receiving user confirmation, creating a database update statement based on the update plan and the instance(s) of the data object in view, wherein the database update statement is an update instruction that comprises the database object that will be updated, the field(s) that will be updated, and the corresponding update value(s), and is in a database query language;
   in response to there not being instance(s) of a data object in view that provide context for the user's natural language input, performing the following:
      evaluating the entities that are not in the update plan for conditional parameters to identify the instance(s) of a data object to be updated;
      confirming the identified instance(s) of a database object, the update field(s), and the update value(s) with the user; and
      in response to receiving user confirmation, generating a database update statement based on the update plan and the conditional parameters, wherein the database update statement is an update instruction that comprises the database object that will be updated, the field(s) that will be updated, and the corresponding update value(s), and is in a database query language.

2. The method of claim 1, wherein identifying the update field(s), the update value(s), the update context, and generating the update plan further comprises:
   obtaining update parameters;
   identifying one or more update fields based on one or more entities tagged as both update fields and query fields;
   identifying one or more update field values based on one or more entities tagged as both (1) an update field value and (2) an operand or contextual entity;
   identifying main and alternate data types accepted by each identified update field;
   matching the one or more update fields with the one or more update field values based on the main and alternate datatype accepted by each identified update field, as well as the location of the one or more update fields and the one or more update field values;
   determining whether there are any unmatched update fields;
   in response to determining that there are one or more unmatched update fields, performing the following:
      identifying one or more generic operands and/or contextual entities matching the main and alternate data types accepted by the one or more unmatched data fields;
      matching the one or more unmatched data fields to the one or more generic operands and/or contextual entities; and
      treating any generic operand or contextual entity matched to an update field as an update field value;
   determining whether there are any unmatched update field values;
   in response to determining whether there are one or more update field values, performing the following:
      identifying generic query fields in the user input that are default fields for the unmatched update value(s);
      attempting to match each unmatched update value with one of the identified query fields; and
      treating any query field matched to an update value as an update field;
   for each update field and update field value pair, computing an update context based on the closest update verb and preposition proceeding the update field in the pair; and
   generating an update plan that include all identified update field and update field value pairs and corresponding update context.

3. The method of claim 2, wherein matching update fields to update values comprises:
   for each update field, identifying any update values for the update field within parameters for a sequential match;
   for each update field with at least one update value within the range parameters for a sequential match, assigning the update field to the closest update value within the range parameters;
   marking any unmatched update fields for processing in a reverse match pass;
   for each marked update field, identifying any update values that are within range parameters for a reverse match; and
   for each marked update field with at least one update value within the range parameters for a reverse match, assigning the update field to the closest update value within the range parameters.

4. The method of claim 3, wherein, for each update field, the range parameters for a sequential match are: (1) the update value appears after the update field but before any subsequent update field; and (2) the update value satisfies the specification for the update field as set forth in the update parameters.

5. The method of claim 4, wherein, for each marked update field, the range parameters for a reverse match are: (1) the update value appears before the update field but after any earlier update field; (2) the update value satisfies the specification for the marked update field as set forth in the update parameters; and (3) the update value is not already matched to another update field.

6. The method of claim 2, wherein prior to identifying any update fields and update values, the system preprocess the entities to remove any redundant, trivial, and subsumed query fields and operands.

7. The method of claim 1, wherein identifying an update context for an update field-update value pair comprises determining whether the update associated with the pair is absolute or relative to an existing value for the update field in the pair.

8. A non-transitory computer-readable medium comprising a computer program, that, when executed by a computer system, enables the computer system to perform the following method for creating a structured database update statement from a user's natural language input, the method comprising:

receiving a user's natural language input via a natural language interface to the system;

applying a natural language model to the user's input to identify an intent and a plurality of entities associated with the user's input, wherein the entities are tagged with an entity type and wherein the entity types include an update verb and corresponding preposition;

determining that the intent relates to an update request for a database;

evaluating the entities to identify update fields and corresponding update values for the update statement;

for each update field and update value pair, identifying an update context for the pair based on an update verb and corresponding preposition proceeding the pair;

generating an update plan that specifies the update field-update value pairs and the corresponding update context for each pair;

determining whether there are instance(s) of a data object in view that provide context for the user's natural language input;

in response to there being instance(s) of a data object in view that provide context for the user's natural language input, performing the following:

asking the user to confirm the update field(s) and update value(s) in the update plan;

in response to receiving user confirmation, creating a database update statement based on the update plan and the instance(s) of the data object in view, wherein the database update statement is an update instruction that comprises the database object that will be updated, the field(s) that will be updated, and the corresponding update value(s), and is in a database query language;

in response to there not being instance(s) of a data object in view that provide context for the user's natural language input, performing the following:

evaluating the entities that are not in the update plan for conditional parameters to identify the instance(s) of a data object to be updated;

confirming the identified instance(s) of a database object, the update field(s), and the update value(s) with the user; and in response to receiving user confirmation, generating a database update statement based on the update plan and the conditional parameters, wherein the database update statement is an update instruction that comprises the database object that will be updated, the field(s) that will be updated, and the corresponding update value(s), and is in a database query language.

9. The non-transitory computer-readable medium of claim 8, wherein identifying the update field(s), the update value(s), the update context, and generating the update plan further comprises:

obtaining update parameters;

identifying one or more update fields based on one or more entities tagged as both update fields and query fields;

identifying one or more update field values based on one or more entities tagged as both (1) an update field value and (2) an operand or contextual entity;

identifying main and alternate data types accepted by each identified update field;

matching the one or more update fields with the one or more update field values based on the main and alternate datatype accepted by each identified update field, as well as the location of the one or more update fields and the one or more update field values;

determining whether there are any unmatched update fields;

in response to determining that there are one or more unmatched update fields, performing the following:

identifying one or more generic operands and/or contextual entities matching the main and alternate data types accepted by the one or more unmatched data fields;

matching the one or more unmatched data fields to the one or more generic operands and/or contextual entities; and treating any generic operand or contextual entity matched to an update field as an update field value;

determining whether there are any unmatched update field values;

in response to determining whether there are one or more update field values, performing the following:

identifying generic query fields in the user input that are default fields for the unmatched update value(s);

attempting to match each unmatched update value with one of the identified query fields; and treating any query field matched to an update value as an update field;

for each update field and update field value pair, computing an update context based on the closest update verb and preposition proceeding the update field in the pair; and generating an update plan that include all identified update field and update field value pairs and corresponding update context.

10. The non-transitory computer-readable medium of claim 9, wherein matching update fields to update values comprises:

for each update field, identifying any update values for the update field within parameters for a sequential match;

for each update field with at least one update value within the range parameters for a sequential match, assigning the update field to the closest update value within the range parameters;

marking any unmatched update fields for processing in a reverse match pass;

for each marked update field, identifying any update values that are within range parameters for a reverse match; and for each marked update field with at least one update value within the range parameters for a reverse match, assigning the update field to the closest update value within the range parameters.

11. The non-transitory computer-readable medium of claim 10, wherein, for each update field, the range parameters for a sequential match are: (1) the update value appears after the update field but before any subsequent update field; and (2) the update value satisfies the specification for the update field as set forth in the update parameters.

12. The non-transitory computer-readable medium of claim 11, wherein, for each marked update field, the range parameters for a reverse match are: (1) the update value appears before the update field but after any earlier update field; (2) the update value satisfies the specification for the marked update field as set forth in the update parameters; and (3) the update value is not already matched to another update field.

13. The non-transitory computer-readable medium of claim 9, wherein prior to identifying any update fields and update values, the system preprocess the entities to remove any redundant, trivial, and subsumed query fields and operands.

14. The non-transitory computer-readable medium of claim 8, wherein identifying an update context for an update field-update value pair comprises determining whether the update associated with the pair is absolute or relative to an existing value for the update field in the pair.

15. A computer system for creating a database update statement from a user's natural language input, the system comprising:
   one or more processors;
   one or more physical memory units coupled to the one or more processors, wherein the one or more memory units store instructions that, when executed by the one or more processors, cause the system to perform the operations of:
   receiving a user's natural language input via a natural language interface to the system;
   applying a natural language model to the user's input to identify an intent and a plurality of entities associated with the user's input, wherein the entities are tagged with an entity type and wherein the entity types include an update verb and corresponding preposition;
   determining that the intent relates to an update request for a database;
   evaluating the entities to identify update fields and corresponding update values for the update statement;
   for each update field and update value pair, identifying an update context for the pair based on an update verb and corresponding preposition proceeding the pair;
   generating an update plan that specifies the update field-update value pairs and the corresponding update context for each pair;
   determining whether there are instance(s) of a data object in view that provide context for the user's natural language input;
   in response to there being instance(s) of a data object in view that provide context for the user's natural language input, performing the following:
      asking the user to confirm the update field(s) and update value(s) in the update plan;
      in response to receiving user confirmation, creating a database update statement based on the update plan and the instance(s) of the data object in view, wherein the database update statement is an update instruction that comprises the database object that will be updated, the field(s) that will be updated, and the corresponding update value(s), and is in a database query language;
   in response to there not being instance(s) of a data object in view that provide context for the user's natural language input, performing the following:
      evaluating the entities that are not in the update plan for conditional parameters to identify the instance(s) of a data object to be updated;
      confirming the identified instance(s) of a database object, the update field(s), and the update value(s) with the user; and
      in response to receiving user confirmation, generating a database update statement based on the update plan and the conditional parameters, wherein the database update statement is an update instruction that comprises the database object that will be updated, the field(s) that will be updated, and the corresponding update value(s), and is in a database query language.

16. The system of claim 15, wherein identifying the update field(s), the update value(s), the update context, and generating the update plan further comprises:
   obtaining update parameters;
   identifying one or more update fields based on one or more entities tagged as both update fields and query fields;
   identifying one or more update field values based on one or more entities tagged as both (1) an update field value and (2) an operand or contextual entity;
   identifying main and alternate data types accepted by each identified update field;
   matching the one or more update fields with the one or more update field values based on the main and alternate datatype accepted by each identified update field, as well as the location of the one or more update fields and the one or more update field values;
   determining whether there are any unmatched update fields;
   in response to determining that there are one or more unmatched update fields, performing the following:
      identifying one or more generic operands and/or contextual entities matching the main and alternate data types accepted by the one or more unmatched data fields;
      matching the one or more unmatched data fields to the one or more generic operands and/or contextual entities; and
      treating any generic operand or contextual entity matched to an update field as an update field value;
   determining whether there are any unmatched update field values;
   in response to determining whether there are one or more update field values, performing the following:
      identifying generic query fields in the user input that are default fields for the unmatched update value(s);
      attempting to match each unmatched update value with one of the identified query fields; and
      treating any query field matched to an update value as an update field;
   for each update field and update field value pair, computing an update context based on the closest update verb and preposition proceeding the update field in the pair; and
   generating an update plan that include all identified update field and update field value pairs and corresponding update context.

17. The system of claim 16, wherein matching update fields to update values comprises:
   for each update field, identifying any update values for the update field within parameters for a sequential match;
   for each update field with at least one update value within the range parameters for a sequential match, assigning the update field to the closest update value within the range parameters;
   marking any unmatched update fields for processing in a reverse match pass;

for each marked update field, identifying any update values that are within range parameters for a reverse match; and for each marked update field with at least one update value within the range parameters for a reverse match, assigning the update field to the closest update value within the range parameters.

18. The system of claim 17, wherein, for each update field, the range parameters for a sequential match are: (1) the update value appears after the update field but before any subsequent update field; and (2) the update value satisfies the specification for the update field as set forth in the update parameters.

19. The system of claim 18, wherein, for each marked update field, the range parameters for a reverse match are: (1) the update value appears before the update field but after any earlier update field; (2) the update value satisfies the specification for the marked update field as set forth in the update parameters; and (3) the update value is not already matched to another update field.

20. The system of claim 16, wherein prior to identifying any update fields and update values, the system preprocess the entities to remove any redundant, trivial, and subsumed query fields and operands.

21. The system of claim 15, wherein identifying an update context for an update field-update value pair comprises determining whether the update associated with the pair is absolute or relative to an existing value for the update field in the pair.

\* \* \* \* \*